US012343634B2

(12) United States Patent
Wei et al.

(10) Patent No.: US 12,343,634 B2
(45) Date of Patent: Jul. 1, 2025

(54) INFORMATION DISPLAY METHOD AND APPARATUS, DEVICE, AND STORAGE MEDIUM

(71) Applicant: Tencent Technology (Shenzhen) Company Limited, Guangdong (CN)

(72) Inventors: Jiacheng Wei, Guangdong (CN); Xun Hu, Guangdong (CN); Shandong Su, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 889 days.

(21) Appl. No.: 17/450,934

(22) Filed: Oct. 14, 2021

(65) Prior Publication Data

US 2022/0032194 A1 Feb. 3, 2022

Related U.S. Application Data

(63) Continuation of application No. PCT/CN2021/095531, filed on May 24, 2021.

(30) Foreign Application Priority Data

May 29, 2020 (CN) .......................... 202010478147.7

(51) Int. Cl.
 *A63F 13/53* (2014.01)
 *A63F 13/58* (2014.01)
 *G06T 19/20* (2011.01)

(52) U.S. Cl.
 CPC .............. *A63F 13/58* (2014.09); *G06T 19/20* (2013.01); *A63F 2300/65* (2013.01);
 (Continued)

(58) Field of Classification Search
 CPC .. A63F 13/58; A63F 13/5372; A63F 2300/65; A63F 2300/807
 See application file for complete search history.

(56) References Cited

U.S. PATENT DOCUMENTS

| 6,241,524 B1 * | 6/2001 | Aoshima ................. A63F 13/45 463/6 |
| 2007/0218966 A1 * | 9/2007 | Tilston ................ A63F 13/5378 463/5 |

(Continued)

FOREIGN PATENT DOCUMENTS

| CN | 108295465 A | 7/2018 |
| CN | 108525300 A | 9/2018 |

(Continued)

OTHER PUBLICATIONS

Baudisch, et al;. Halo: a technique for visualizing off-screen objects, Apr. 5, 2003, CHI '03: Proceedings of the SIGCHI Conference on Human Factors in Computing Systems, pp. 481-488 (Year: 2003).*

(Continued)

*Primary Examiner* — Corbett B Coburn
(74) *Attorney, Agent, or Firm* — ArentFox Schiff LLP

(57) ABSTRACT

In a display method, a position of a second virtual object is obtained, and when the second virtual object is within a target region outside a visual field picture, indication information of the second virtual object can be displayed at an edge of the current visual field picture, thereby achieving an effective prompt of the information of the second virtual object, and increasing an amount of information displayed in the visual field picture. In addition, the displayed information may be directed to features not shown in the visual field picture, so that an information display effect in a game match is better.

18 Claims, 10 Drawing Sheets

(52) U.S. Cl.
CPC ..... *A63F 2300/807* (2013.01); *G06T 2200/24* (2013.01); *G06T 2219/2016* (2013.01)

(56) References Cited

U.S. PATENT DOCUMENTS

| | | | |
|---|---|---|---|
| 2010/0285873 A1 | 11/2010 | Tawara et al. | |
| 2019/0188868 A1* | 6/2019 | Bagnall | G06T 7/75 |
| 2020/0155941 A1 | 5/2020 | Ito | |
| 2020/0316470 A1 | 10/2020 | Yang | |
| 2020/0330866 A1 | 10/2020 | Yang | |
| 2022/0080310 A1* | 3/2022 | Fung | A63F 13/822 |
| 2022/0342212 A1* | 10/2022 | Price | G02B 27/0189 |

FOREIGN PATENT DOCUMENTS

| | | |
|---|---|---|
| CN | 108619721 A | 10/2018 |
| CN | 108704316 A | 10/2018 |
| CN | 110833694 A | 2/2020 |
| CN | 111185004 A | 5/2020 |
| CN | 111672126 A | 9/2020 |
| JP | 07008632 A | 1/1995 |
| JP | 2000140416 A | 5/2000 |
| JP | 2007244540 A | 9/2007 |
| JP | 2007260157 A | 10/2007 |
| JP | 2018-057462 A | 4/2018 |
| JP | 2018192326 A | 12/2018 |
| JP | 2019-527956 A | 10/2019 |

OTHER PUBLICATIONS

Japanese Office Action mailed Dec. 23, 2022 in corresponding Application No. 2021-566346, with English Translation, 9 pages.
Singaporean Search Report and Office Action mailed May 10, 2023 in corresponding Application No. 11202112178S, 11 pages.
Korean Office Action mailed Aug. 18, 2023 in corresponding Application No. 10-2021-7033811, 27 pages.
Badaro, A simple defense game(Wars Online). mobile game, Blogpost, (Apr. 1, 2013) http://badaro2001.blogspot.com/2013/04/wars-online.html.
Supplementary European Search Report mailed Aug. 2, 2022 in corresponding Application No. 21785743.2, 10 pages.
Alisallon "Unity3D: Display the position of other players/enemies/objects on the edge of the screen" Apr. 20, 2019 (5 pages) http://www.jian shu.com/p/ecbfe9c8 8fb2.
Black-Coder "UGUI implements indicator arrow of monsters outside the screen", May 7, 2016 (5 pages) http://blog.csdn.net/akak2010110/ article/details/5133 8800?utm_source= app&app_version= 4.7.1&code=app_ 1562916241&uLinkld=usr1mkqgl919 blen.
International Search Report dated Aug. 20, 2021 issued in corresponding application PCT/CN2021/095531 (11 pages).
Office Action dated May 19, 2021 issued in corresponding Chinese application No. 202010478147.7 (with English translation) (12 pages).
Office Action received for Japanese Patent Application No. 2023-110007, mailed on Sep. 30, 2024.

* cited by examiner

INFORMATION DISPLAY METHOD AND APPARATUS, DEVICE, AND STORAGE MEDIUM

RELATED APPLICATIONS

This application is a continuation of International Application No. PCT/CN2021/095531, filed on May 24, 2021, which claims priority to Chinese Patent Application No. 202010478147.7, entitled "INFORMATION DISPLAY METHOD AND APPARATUS, DEVICE, AND STORAGE MEDIUM" filed on May 29, 2020. The disclosures of the prior applications are hereby incorporated by reference in their entirety.

FIELD OF THE TECHNOLOGY

This application relates to the field of computer technologies, including an information display method and apparatus, a device, and a storage medium.

BACKGROUND OF THE DISCLOSURE

With the development of computer technologies and the diversity of terminal functions, more and more types of games can be played on a terminal. A multiplayer online battle arena (MOBA) game is a relatively popular game. A terminal may display a virtual scene in an interface, and display a virtual object in the virtual scene, and the virtual object may battle with other virtual objects by releasing skills.

SUMMARY

Embodiments of this application provide an information display method and apparatus, a device, and a storage medium. The technical solutions are as follows.

In an embodiment, an information display method includes controlling, according to a position of a first virtual object, display of a visual field picture of the first virtual object in a graphical user interface, and obtaining a position of a second virtual object. The method also includes controlling display, by processing circuitry of an electronic device, of indication information of the second virtual object in the visual field picture in response to the position of the second virtual object being within a target region and according to a position relationship of the second virtual object relative to the first virtual object, the target region being a region outside the visual field picture.

In an embodiment, an information display apparatus includes processing circuitry configured to control display, according to a position of a first virtual object, of a visual field picture of the first virtual object in a graphical user interface, and obtain a position of a second virtual object. The processing circuitry is further configured to control display of indication information of the second virtual object in the visual field picture in response to the position of the second virtual object being within a target region and according to a position relationship of the second virtual object relative to the first virtual object, the target region being a region outside the visual field picture.

In an embodiment, a non-transitory computer-readable storage medium stores computer-readable instructions thereon, which, when executed by an electronic device, cause the electronic device to perform an information display method. The method includes controlling, according to a position of a first virtual object, display of a visual field picture of the first virtual object in a graphical user interface, and obtaining a position of a second virtual object. The method also includes controlling display of indication information of the second virtual object in the visual field picture in response to the position of the second virtual object being within a target region and according to a position relationship of the second virtual object relative to the first virtual object, the target region being a region outside the visual field picture.

The technical solutions provided in the embodiments of this application achieve at least the following beneficial effects.

In embodiments of this application, a position of a second virtual object is obtained, and when the second virtual object is within a target region outside a visual field picture, indication information of the second virtual object can be displayed at an edge of the current visual field picture, thereby achieving an effective prompt of the information of the second virtual object, and increasing an amount of displaying information in the visual field picture. In addition, the displayed information is not limited to the information in the visual field picture, thereby making an effective prompt of the information of the second virtual object outside the visual field picture, also assisting a user in better interacting with the second virtual object (for example, whether a specific skill successfully hits the second virtual object being determined by using the position of the second virtual object), and improving the precision of the user's actions on the second virtual object. Therefore, an information display is more effective in a game match.

BRIEF DESCRIPTION OF THE DRAWINGS

To describe the technical solutions in embodiments of this application, the following briefly introduces the accompanying drawings describing the embodiments. The accompanying drawings in the following description show only some embodiments of this application, and a person of ordinary skill in the art may still derive other accompanying drawings from these accompanying drawings.

DESCRIPTION OF EMBODIMENTS

Figure 1:
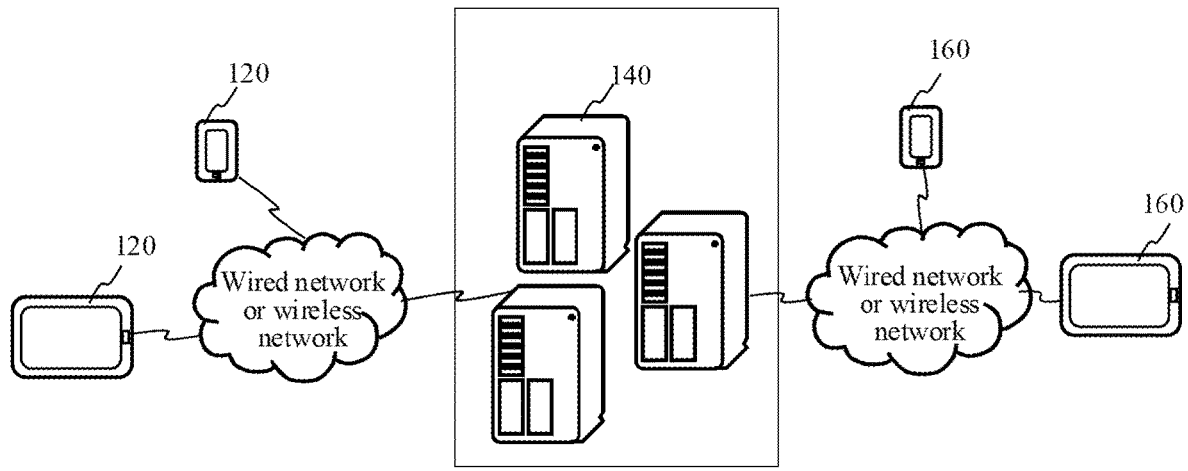
FIG. 1 is a schematic diagram of an implementation environment of an information display method according to an embodiment of this application.

To make objectives, technical solutions, and advantages of this application clearer, the following further describes implementations of this application in detail with reference to the accompanying drawings.

The terms "first", "second", and the like in this application are used for distinguishing between same items or similar items of which effects and functions are basically the same. The "first", "second", and "nth" do not have a dependency relationship in logic or time sequence, and a quantity and an execution order thereof are not limited.

In this application, the term "at least one" refers one or more, and "at least two" refers to two or more. For example, "at least two node devices" refers to two or more node devices.

Terms involved in this application are explained below.

Virtual scene: a virtual scene displayed (or provided) when an application program is run on a terminal. The virtual scene may be a simulated scene of a real scene, or may be a semi-simulated semi-fictional 3D scene, or may be an entirely fictional 3D scene. The virtual scene may be any one of a 2D virtual scene, a 2.5-dimensional virtual scene, and a 3D virtual scene. A dimension of the virtual scene is not limited in this embodiment of this application.

Further, the virtual scene is further used for a virtual scene battle between at least two virtual objects, and there are virtual resources available to the at least two virtual objects in the virtual scene. Further, the virtual scene includes a lower left corner region and an upper right corner region that are symmetrical. Virtual objects in two opposing camps occupy the regions respectively, and an objective of each side is to destroy a target building/fort/base/crystal deep in an opponent's region to win victory.

Further, a base of each region in the virtual scene may further include a resource supplementary fort, and the virtual object may return to the resource supplementary fort to supplement a required resource, for example, equipment used by the virtual object. In a specific possible embodiment, the resource supplementary fort may be provided with a virtual store, and the virtual object may purchase a virtual resource from the virtual store by using virtual coins obtained in a current game.

A place in which the virtual object supplements the resource may not be limited either, and the virtual object may supplement the resource at any position in the virtual scene. In a possible implementation, a virtual store button may be provided in a graphical user interface. When detecting a trigger operation on the virtual store button, the terminal may display the virtual resources in the virtual store, and equip the virtual object with a corresponding virtual resource according to a selection operation and a confirmation operation of a user.

In a specific possible embodiment, to simplify user operations, the terminal may obtain and display a recommended resource of the virtual object according to an attribute of the virtual object, and, when detecting a trigger operation on any recommended resource, the terminal equips the virtual object with a corresponding virtual resource. Further, the foregoing recommended resource may be a resource that conforms to the attribute of the virtual object and has a value within virtual coins owned by the virtual object.

Further, the virtual object may also quickly restore a status in the resource supplementary fort, for example, quickly restore a virtual health point or a mana point. Further, if eliminated in the virtual scene, the virtual object may further be resurrected in the resource supplementary fort after a period of time. In this implementation, the resource supplementary fort may also be referred to as a "birth place".

Virtual object: a movable object in a virtual scene. The movable object may be at least one of a virtual character, a virtual animal, and a cartoon character. Further, when the virtual scene is a 3D virtual scene, the virtual objects may be 3D models. Each virtual object has a shape and a volume in the 3D virtual scene, and occupies a part of space in the 3D virtual scene. Further, the virtual object is a 3D character constructed based on 3D human skeleton technology. The virtual object wears different skins to implement different appearances. In some implementations, the virtual object may be alternatively implemented by using a 2.5-dimensional model or a 2D model. This is not limited in this embodiment of this application.

Further, the virtual object may be a player character controlled through operations on a client, or may be an artificial intelligence (AI) obtained through training and disposed in a virtual scene battle, or may be a non-player character (NPC) disposed in virtual scene interaction. Further, the virtual object may be a virtual character competing in the virtual scene. Further, a quantity of virtual objects participating in interaction in the virtual scene may be preset, or may be dynamically determined according to a quantity of clients participating in interaction.

Further, the virtual objects in the virtual scene may be virtual objects with different images, or may be virtual objects with the same image. The virtual objects with different images may have different skills. Further, there may be different types of virtual objects in the virtual scene, and different types of virtual objects may have different images, or may have different skills. An image or a type of the virtual object may be selected before the user enters the virtual scene. For example, the virtual objects may include five types, namely, mage, warrior, tank/support, archer, and assassin. A skill of the mage is generally a spell skill, and different mages may have different spell skills. A skill of the warrior is generally a physical attack made by using a body or a virtual weapon, and different warriors may have different virtual weapons. A virtual health point/defense capability of the tank/support may be greater than a virtual health point/defense capability of other types of virtual objects, and a skill of the tank/support may be a skill such as a control skill or restoring the virtual health point. The archer generally causes damage to an enemy by using a remote attack. A skill of the archer is generally attached effect of a shot virtual item or a shot virtual item with a different attribute. For example, a shot arrow has a deceleration effect and an attached poison effect, and a shooting range of three shot arrows or one shot arrow is greater than an arrow having a normal attack shooting range. A skill of the assassin is generally a concealed skill, a stab skill, or the like, and can cause damage when the enemy is thoughtless.

A MOBA is an arena in which different virtual teams in at least two opposing camps occupy respective map regions in a virtual scene, and compete against each other using a specific victory condition as an objective. The victory conditions include, but not limited to, at least one of occupying forts or destroy forts of an opposing camp, killing virtual objects in the opposing camp, ensuring own survivals in a specified scenario and time, seizing a specific resource, and outscoring an opponent within a specified time. The battle arena may take place in rounds, and each round of the battle arena may have the same map or different maps. Each virtual team includes one or more virtual objects, for example, 1 virtual object, 2 virtual objects, 3 virtual objects, or 5 virtual objects.

MOBA game: a game in which several forts are provided in a virtual scene, and users in different camps control virtual objects to battle in the virtual scene, occupy forts or destroy forts of an opposing camp. For example, in the MOBA game, the users may be divided into two opposing camps. The virtual objects controlled by the users are scattered in the virtual scene to compete against each other, and the victory condition is to destroy or occupy all enemy forts. The MOBA game takes place in rounds, and a duration of one round of the MOBA game is from a moment at which the game starts to a movement at which the victory condition is met.

In the MOBA game, the users may further control the virtual objects to release skills to fight with other virtual objects. For example, types of the skills may include attack skill, defense skill, healing skill, auxiliary skill, beheading skill, and the like. Each virtual object may respectively have one or more fixed skills, different virtual objects generally have different skills, and different skills may produce different effects. For example, if an attack skill released by a virtual object hits a hostile virtual object, certain damage is caused to the hostile virtual object, and is generally shown as deducting a part of virtual health points of the hostile virtual object. In another example, if a healing skill released by a virtual object hits a friendly virtual object, certain healing is produced for the friendly virtual object, and is generally shown as restoring a part of virtual health points of the friendly virtual object. All other types of skills may produce corresponding effects, and details are not described herein again.

FIG. 1 is a schematic diagram of an implementation environment of an information display method according to an embodiment of this application. Referring to FIG. 1, the implementation environment includes: a first terminal 120, a server 140, and a second terminal 160.

An application program supporting a virtual scene is installed and run on the first terminal 120. The application program may be any one of a MOBA game, a virtual reality application program, a 2D or 3D map program, and a simulation program. The application program may alternatively be another program, for example, a multiplayer gunfight survival game, which is not limited in this embodiment of this application. The first terminal 120 may be a terminal used by a first user, and the first user operates, by using the first terminal 120, a first virtual object in the virtual scene to perform movements. The movements include, but not limited to, at least one of walking, running, a body posture adjustment, a normal attack, and skill releasing. The movements may further include other items such as shooting and throwing, which are not limited in this embodiment of this application. For example, the first virtual object is a first virtual character such as a simulated character role or a cartoon character role. For example, the first virtual object may be a first virtual animal such as a simulated monkey or another animal.

The first terminal 120 and the second terminal 160 are connected to the server 140 through a wireless network or a wired network.

The server 140 may include at least one of one server, a plurality of servers, a cloud computing platform, or a virtualization center. The server 140 is configured to provide a backend service for the application program supporting the virtual scene. Further, the server 140 may take on primary computing work, and the first terminal 120 and the second terminal 160 may take on secondary computing work. Alternatively, the server 140 takes on secondary computing work, and the first terminal 120 and the second terminal 160 take on primary computing work; or collaborative computing is performed by using a distributed computing architecture among the server 140, the first terminal 120, and the second terminal 160.

The server 140 may be an independent physical server, or may be a server cluster or a distributed system including a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, or an AI platform. The first terminal 120 and the second terminal 160 may be a smartphone, a tablet computer, a notebook computer, a desktop computer, a smart speaker, a smartwatch, or the like, but are not limited thereto. The first terminal 120 and the second terminal 160 may be directly or indirectly connected to the server in a wired or wireless communication manner. This is not limited in this embodiment of this application.

For example, the first terminal 120 and the second terminal 160 may send generated data to the server 140, and the server 140 may perform verification on data generated by the server and the data generated by the terminals. If the data generated by the server is inconsistent with a verification result indicating data of any terminal, the data generated by the server may be sent to any terminal, and any terminal is subject to the data generated by the server.

In a possible implementation, the first terminal 120 and the second terminal 160 may determine each frame of virtual scene according to a trigger operation of a user, and send the virtual scene to the server 140, or may send information of the trigger operation of the user to the server 140. The server 140 may receive the information of the trigger operation and the virtual scene, determine a virtual scene according to the trigger operation, and compare the virtual scene with the virtual scene uploaded by the terminal. If the virtual scene is consistent with the virtual scene uploaded by the terminal, subsequent calculations may continue to be performed; and if the virtual scene is inconsistent with the virtual scene uploaded by the terminal, the virtual scene determined by the server may be sent to each terminal for synchronization. In a specific possible embodiment, the server 140 may further determine a next frame of virtual scene of each terminal according to the information of the trigger operation, and send the next frame of virtual scene to the each terminal, so that the each terminal performs a corresponding step to obtain a virtual scene consistent with the next frame of virtual scene determined by the server 140.

An application program supporting a virtual scene is installed and run on the second terminal 160. The application program may be any one of a MOBA game, a virtual reality application program, a 2D or 3D map program, and a simulation program. The application program may alternatively be another program, for example, a multiplayer gunfight survival game, which is not limited in this embodiment of this application. The second terminal 160 may be a terminal used by a second user, and the second user operates, by using the second terminal 160, a second virtual object in the virtual scene to perform movements. The movements include, but not limited to, at least one of walking, running, a body posture adjustment, a normal attack, and skill releasing. The movements may further include other items such as shooting and throwing, which are not limited in this embodiment of this application. For example, the second virtual object is a second virtual character such as a simulated character role or a cartoon character role. For example, the second virtual object may be a second virtual animal such as a simulated monkey or another animal.

Further, the first virtual object controlled by the first terminal 120 and the second virtual object controlled by the second terminal 160 are in the same virtual scene. In this case, the first virtual object may interact with the second virtual object in the virtual scene. In some embodiments, the first virtual object and the second virtual object may be a hostile relationship. For example, the first virtual object and the second virtual object may pertain to different teams, organizations, or camps. The virtual objects in the hostile relationship may interact with each other in a battle manner by releasing skills at any position in the virtual scene.

In some other embodiments, the second virtual character and the first virtual character may alternatively pertain to a teammate relationship. For example, the first virtual object and the second virtual object pertain to the same team, organization, or camp, have a friend relationship, or have a temporary communication permission.

Further, the application programs installed on the first terminal 120 and the second terminal 160 are the same, or the application programs installed on the two terminals are the same type of application programs in different operating system platforms. The first terminal 120 may be generally one of a plurality of terminals, and the second terminal 160 may be generally one of a plurality of terminals. In this embodiment, only the first terminal 120 and the second terminal 160 are used as an example for description. Device types of the first terminal 120 and the second terminal 160 are the same or different. The device types include at least one of a smartphone, a tablet computer, an ebook reader, a Moving Picture Experts Group Audio Layer III (MP3) player, a Moving Picture Experts Group Audio Layer IV (MP4) player, a laptop computer, and a desktop computer. For example, the first terminal 120 and the second terminal 160 may be smartphones or another handheld portable game devices. The following embodiment is described by using an example in which the terminal is a smartphone.

A person skilled in the art may understand that there may be more or fewer terminals. For example, there may be only one terminal, or there may be dozens, hundreds, or more terminals. A quantity and the device types of the terminals are not limited in this embodiment of this application.

Figure 2:
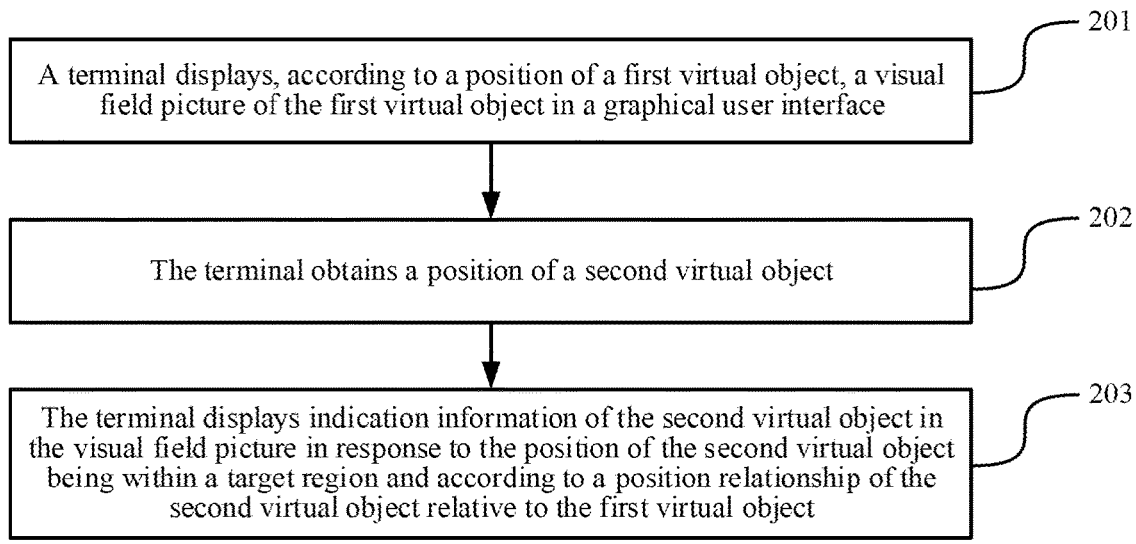
FIG. 2 is a flowchart of an information display method according to an embodiment of this application.

FIG. 2 is a flowchart of an information display method according to an embodiment of this application. The method is applicable to an electronic device, and the electronic device may be a terminal. That is, an executing device of the steps of the information display method may be the terminal. In some embodiments, the execution body of the steps may alternatively be a client of an application program that is installed and run on the terminal. In this embodiment, description is made by using an example in which the method is applicable to the terminal. Referring to FIG. 2, the method may include the following steps:

In step 201, a terminal displays, according to a position of a first virtual object, a visual field picture of the first virtual object in a graphical user interface.

The first virtual object is a virtual object controlled by the current terminal, and the visual field picture is a virtual scene that the terminal controlling the first virtual object can observe. Specifically, the visual field picture may be a virtual scene captured by a virtual camera following the first virtual object.

The foregoing first virtual object is a virtual object controlled by a user. Further, the user logs in to the client of the application program by using a user account, and further uses a virtual object corresponding to the user account as the first virtual object, and the user may control the first virtual object to perform various operations in the virtual scene. In some embodiments, the foregoing user account may correspond to one or more virtual objects. When the user account corresponds to a plurality of virtual objects, the user may select a specific virtual object as the foregoing first virtual object according to system design.

In step 202, the terminal obtains a position of a second virtual object.

In this embodiment of the application, the terminal may obtain the position of the second virtual object, determine, based on the position, whether the second virtual object is within the visual field picture of the first virtual object, and determine whether the second virtual object or indication information of the second virtual object needs to be displayed.

The second virtual object may be a virtual object pertaining to a team different from that of the first virtual object, or may be a virtual object pertaining to a team that is the same as that of the first virtual object, or may be any virtual object other than the first virtual object. Further, the terminal obtains a position of at least one second virtual object. For example, the terminal obtains positions of all the second virtual objects in a game match. Alternatively, the terminal obtains a position of a second virtual object with a special attribute in a game match; or the terminal obtains a position of the second virtual object that has a distance with the first virtual object being less than a specific value.

In step 203, the terminal displays indication information of the second virtual object in the visual field picture in response to the position of the second virtual object being within a target region and according to a position relationship of the second virtual object relative to the first virtual object, the target region being a region outside the visual field picture.

The position relationship is a relative position relationship between the second virtual object and the first virtual object. Further, in this embodiment of the application, the foregoing position relationship is indicated by using a connecting line (such as a line segment or a vector) between the first virtual object and the second virtual object. In some embodiments, the foregoing position relationship may alternatively be indicated by using a distance, a deflection angle, relative coordinates, and the like between the first virtual object and the second virtual object.

In this embodiment of the application, when it is determined that the position of the second virtual object is within the target region, the terminal displays the indication information of the second virtual object in the visual field picture according to the position relationship of the second virtual object relative to the first virtual object. Further, in this embodiment of this application, the indication information of the second virtual object outside the visual field picture may be displayed, to prompt the position of the second virtual object outside the visual field picture. Specifically, after obtaining the position of the second virtual object, the terminal may determine whether the position of the second virtual object is outside the visual field picture, and may further determine, for any second virtual object outside the visual field picture of the first virtual object, whether a position of the second virtual object is within the target region outside the visual field picture, that is, whether the position of the second virtual object is around the visual field picture, to determine whether the indication information of the second virtual object needs to be displayed.

Further, the foregoing target region is any region outside the visual field picture. For example, to ensure the simplicity of the visual field picture, only a second virtual object that is located near the first virtual object is displayed in the visual field picture. That is, the target region is a region around the visual field picture. Further, when the target region is determined, edge lines of the visual field picture are obtained, and a region formed by points that have distances with the edge lines of the visual field picture less than a specific value is further determined as the foregoing target region from the region outside the visual field picture.

If the position of the second virtual object is within the visual field picture, the second virtual object may be directly displayed in the graphical user interface based on the position of the second virtual object. For example, when the position of the second virtual object is within the visual field picture, the second virtual object is displayed at the position of the second virtual object.

In addition, in the related art, a visual field picture is generally obtained according to the position of the first virtual object, and the second virtual object may be displayed at a corresponding position for only the second virtual object within the visual field picture. Obviously, only the second virtual object that enters the visual field picture of the first virtual object may be displayed, resulting in a small information displayed amount, and consequently the user cannot learn a situation of the second virtual object at a farther distance. In some special application scenarios, due to a small information amount, inconvenience to user operations is also brought. For example, when some skills that have long releasing distances are released, the user does not learn the situation of the second virtual object outside the visual field picture, and naturally has no information basis for releasing the skills. Therefore, the information display method in the related art has a poor display effect.

In this embodiment of the application, a position of a second virtual object is obtained, and when the second virtual object is within a target region outside a visual field picture, indication information of the second virtual object can be displayed at an edge of the current visual field picture, thereby achieving an effective prompt of the information of the second virtual object, and increasing an amount of information displayed in the visual field picture. In addition, the displayed information is not limited to the information in the visual field picture, thereby making an effective prompt of the information of the second virtual object outside the visual field picture, also assisting a user in better interacting with the second virtual object (for example, whether a specific skill successfully hits the second virtual object being determined by using the position of the second virtual object), and improving the control precision of the user on the second virtual object. Therefore, an information display effect in a game match is better.

Figure 3:
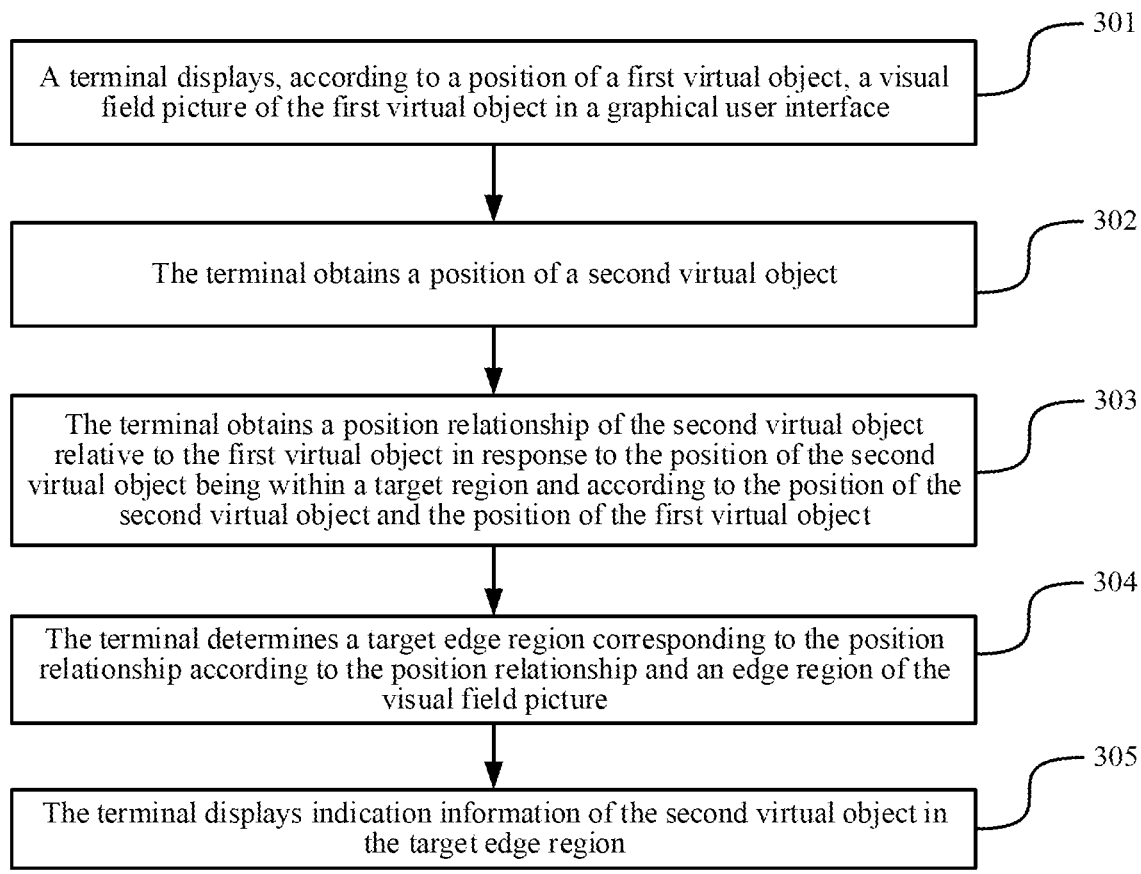
FIG. 3 is a flowchart of an information display method according to an embodiment of this application.

FIG. 3 is a flowchart of an information display method according to an embodiment of this application. Referring to FIG. 3, the method includes the following steps.

In step 301, a terminal displays, according to a position of a first virtual object, a visual field picture of the first virtual object in a graphical user interface.

The terminal may display the visual field picture of the first virtual object. The visual field picture may include the first virtual object, and a virtual environment around the first virtual object may further include other virtual objects around the first virtual object, and the like.

Further, the displayed visual field picture is generally obtained through observation by using a virtual camera, to simulate an observed visual field when a specific real environment is observed by using a specific camera. To achieve a better 3D effect, the virtual camera may be above a ground of a virtual scene by a specific height, to observe the virtual scene by using a specific oblique visual angle. Therefore, in the foregoing step 301, the terminal may obtain the position of the first virtual object, determine a position of the virtual camera according to the position of the first virtual object and an angle between a height of the virtual camera and a vertical direction, and determine the visual field picture of the first virtual object from a global virtual scene according to the position of the virtual camera. In the visual field picture, the first virtual object is in a central position of the visual field picture, and what is displayed in the visual field picture is the environment around the first virtual object.

Figure 4:
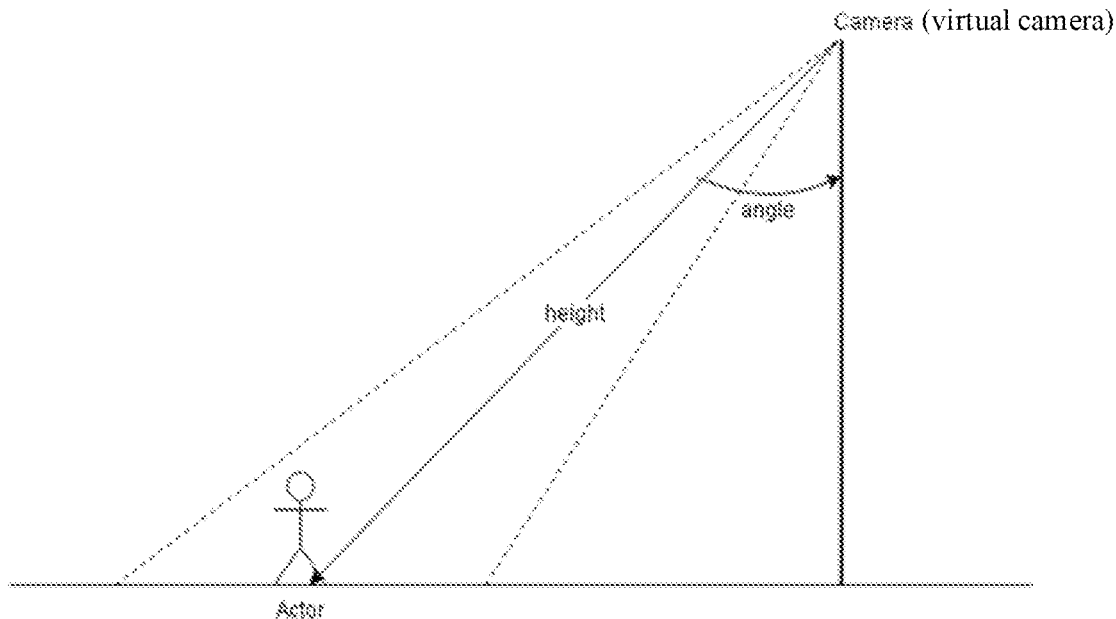
FIG. 4 is a schematic diagram of a position relationship between a first virtual object and a virtual camera according to an embodiment of this application.

For example, as shown in FIG. 4, the height of the virtual camera may be height, an angle with the vertical direction may be angle, and the position of the first virtual object (an actor) may be ActorPos. When the position of the virtual camera is obtained by using ActorPos, it can be implemented by using the following formula 1 to formula 3:

cameraPos.x=ActorPos.x      Formula 1:

cameraPos.y=ActorPos.y+height*cos(angle)      Formula 2:

cameraPos.z=ActorPos.z−height*sin(angle)      Formula 3:

cameraPos.x, cameraPos.y, and camearPos.z are coordinates of x, y, and z axes of the virtual camera respectively, and ActorPos.x, ActorPos.y, and ActorPos.z are coordinates of x, y, and z axes of ActorPos respectively. cos( ) is a cosine function, and sin( ) is a sine function.

The foregoing description of the position of the virtual camera is merely exemplary and explanatory. In some embodiments, different visual field pictures may be obtained by disposing the virtual camera in different positions according to system design. For example, in a first-person game, by using the position of the first virtual object as a reference, the virtual camera is located right in front of the first virtual object ("right in front" may be determined based on an eye position of the first virtual object), and the virtual camera further determines a field of view of the first virtual object from a global virtual scene from a first-person perspective of the first virtual object. In this case, the first virtual object is outside the field of view. That is, the first virtual object is not displayed in the foregoing graphical user interface. In another example, in a third-person game, by using the position of the first virtual object as a reference, the virtual camera is located obliquely behind the first virtual object, and the virtual camera further determines a field of view of the first virtual object from a global virtual scene from a third-person perspective of the first virtual object. In this case, the first virtual object is in an edge region of the field of view. That is, the first virtual object is displayed in the edge region of the foregoing graphical user interface. The user may adjust the virtual camera according to a requirement of the user. For example, the user adjusts a shooting position and a shooting angle of the virtual camera through a sliding operation or a zoom operation for the graphical user interface.

In step 302, the terminal obtains a position of a second virtual object.

The terminal may determine whether there is a second virtual object that needs to be prompted in the form of indication information, may consequently obtain the position of the second virtual object, and further determine, by using the position, whether the second virtual object is within a target region.

In a possible implementation, the terminal may identify the position of the second virtual object by using a 2D position. Correspondingly, step 302 may be implemented by using step 1 and step 2. The 2D position is a position of a virtual object in the graphical user interface, and correspondingly, a 3D position is a position of a virtual object in the virtual scene. Further, there is a mutual conversion relationship between the 3D position and the 2D position. The 2D position may be obtained by mapping the 3D position to a 2D image, and the 3D position may be obtained by converting the 2D position into a 3D space.

In step 1, the terminal obtains a 3D position of the second virtual object in a virtual scene.

The virtual scene may be a 3D virtual space. The terminal may read the 3D position of the second virtual object in the virtual scene, and the 3D position may be obtained through synchronization by the terminal controlling the second virtual object by using the server, or may be obtained by the server according to user operations. This is not limited in this embodiment of this application.

In a specific possible embodiment, the position of the second virtual object may be identified by using a position of a target part of the second virtual object. That is, step 1 may be as follows: The terminal obtains a 3D position of a target part of the second virtual object in a virtual scene. The target part may be set according to system requirements.

In a possible implementation, the foregoing target part is any body part of the virtual object. For example, the target part may be feet, or may be a head, a waist, or the like, which is not limited in this embodiment of this application.

In another possible implementation, because different virtual objects may have different shapes, the foregoing target part is a central part corresponding to a plurality of body parts of the virtual object. For example, when obtaining a position of the target part, the terminal respectively obtains positions corresponding to the foregoing plurality of body parts, then determines the central part corresponding to the plurality of body parts (for example, position coordinates of the central part being obtained by performing averaging processing on position coordinates of the plurality of body parts) based on the positions corresponding to the plurality of body parts, and further determines the position of the central part as the position of the target part. For example, the target part may be a central part corresponding to feet, a central part corresponding to hands, a central part corresponding to limbs, or a central part corresponding to limbs and a head.

In step 2, the terminal converts the 3D position of the second virtual object into a 2D position according to an angle between a virtual camera and a vertical direction.

After obtaining the 3D position, the terminal may convert the 3D position into the 2D position, and analyze, by using the 2D position, whether the second virtual object is within a target region. It may be understood that if a 2D second virtual object is identified by using a user interface (UI), this process is to calculate a position of the UI.

For example, the process of converting the 3D position into a 2D position may be implemented through matrix calculation. The following provides a formula 4 for converting the 2D position into the 3D position. In this application, the 3D position may be converted into the 2D position through an inverse conversion process.

$$Z_c \begin{bmatrix} u \\ v \\ 1 \end{bmatrix} = \begin{bmatrix} \frac{1}{dx} & 0 & u_0 \\ 0 & \frac{1}{dy} & v_o \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ \vec{0} & 1 \end{bmatrix} \begin{bmatrix} X_w \\ Y_w \\ Z_w \\ 1 \end{bmatrix} = \quad \text{Formula 4}$$

$$\begin{bmatrix} f_x & 0 & u_0 & 0 \\ 0 & f_y & v_0 & 0 \\ 0 & 0 & 1 & 0 \end{bmatrix} \begin{bmatrix} R & T \\ \vec{0} & 1 \end{bmatrix} \begin{bmatrix} X_w \\ Y_w \\ Z_w \\ 1 \end{bmatrix} \begin{bmatrix} f_x & 0 & u_0 & 0 \\ 0 & f_y & v_0 & 0 \\ 0 & 0 & 1 & 0 \end{bmatrix}$$

is an intrinsic camera parameter matrix, and $$\begin{bmatrix} R & T \\ \vec{0} & 1 \end{bmatrix}$$

is an extrinsic camera parameter matrix.

Figure 5:
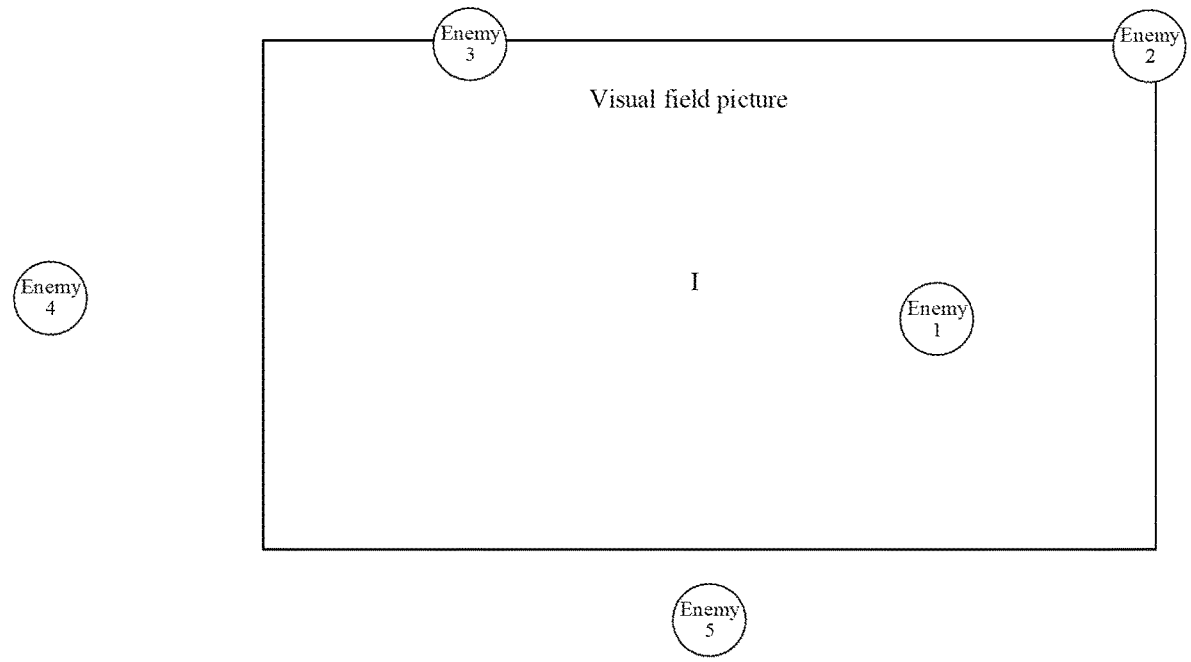
FIG. 5 is a schematic diagram of a position of a virtual object according to an embodiment of this application.

In a specific example, as shown in FIG. 5, "T" is a first virtual object, an example in which second virtual objects are enemy virtual objects is used herein, and the second virtual objects are named as an enemy 1, an enemy 2, an enemy 3, an enemy 4, and an enemy 5. A position relationship diagram shown in FIG. 5 may be obtained by converting 3D positions of five second virtual objects into positions respectively corresponding to UIs.

In step 303, the terminal obtains a position relationship of the second virtual object relative to the first virtual object in response to the position of the second virtual object being within a target region and according to the position of the second virtual object and the position of the first virtual object.

The target region is a region outside the visual field picture. Further, the target region is a region outside the visual field picture and surrounding the visual field picture, that is, a region around the visual field picture. It may be understood that second virtual objects outside the visual field picture but around the visual field picture may also affect the first virtual object. Therefore, position prompts may be made to the second virtual objects.

For example, after the current visual field picture is enlarged according to a specific ratio, a region in which the enlarged visual field picture does not overlap with the visual field picture may be used as the target region. In another example, a region outside the visual field picture and within a target region box formed by points that have distances with edge lines being a distance threshold outside the visual field picture may be used as the target region. For example, the ratio may be 1.4. That is, the target region may be a region obtained by subtracting a screen from 1.4 times of the screen.

After obtaining the positions of the second virtual objects, the terminal may determine whether the positions are within the target region. If the positions are within the target region, position prompts need to be made; and if the positions are not within the target region, there may be two cases. One case is that the positions of the second virtual objects are within the visual field picture. In this case, the second virtual objects are displayed in the visual field picture. The other case is that the positions of the second virtual objects are outside the visual field picture and the target region. If the second virtual objects have relatively long distances and have a little impact on the first virtual object, there is no need to make position prompts on the second virtual objects.

Figure 6:
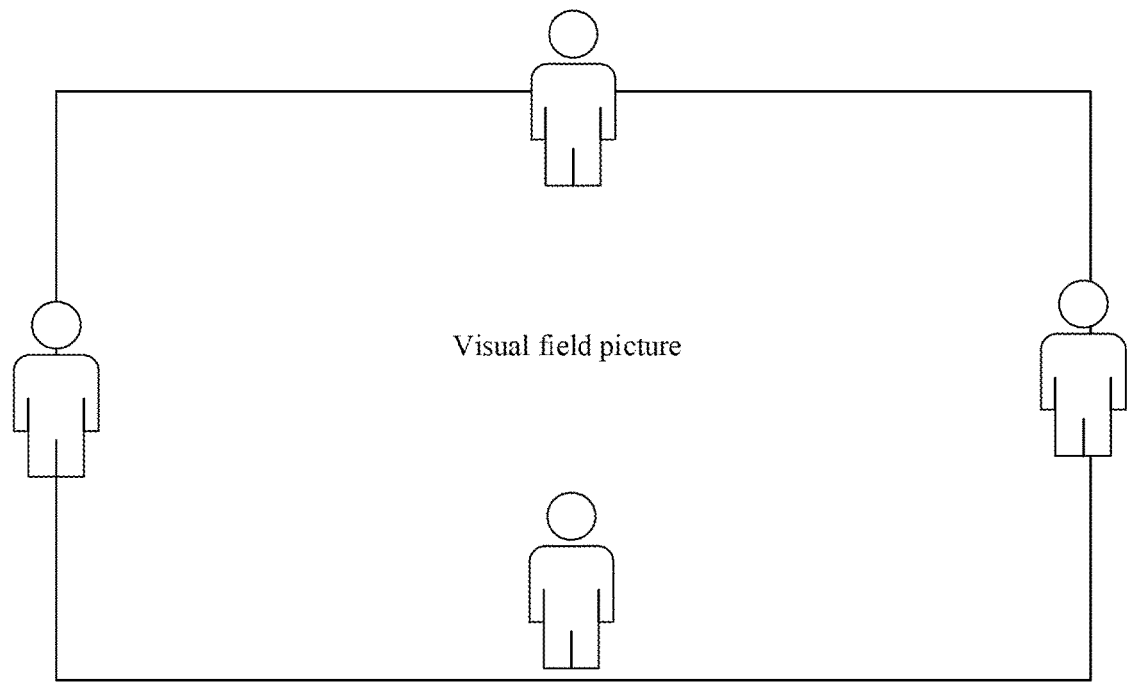
FIG. 6 is a schematic diagram of a position of a virtual object according to an embodiment of this application.

During determination whether the positions are within the target region, because the second virtual object is generally represented as a 3D model, if the position of the second virtual object is identified by using a position of feet, a phenomenon of uniform determination standards of each edge of the visual field picture may appear. Specifically, as shown in FIG. 6, when "half of bodies" of enemies on the left and the right of a screen expose, it is determined that the enemies are outside the screen. When an "entire body" of an enemy in an upper side exposes, it is determined that the enemy is outside the screen, and when "nothing" exposes in a lower side of the screen, it is determined that an enemy is outside the screen. In this way, the enemies in different directions display different senses and have different detection standards.

In a specific possible embodiment, to unify the detection standards in various directions, the terminal may offset the visual field picture in various directions according to the visual field picture of the first virtual object and according to a first target offset, to obtain a detection range of the visual field picture, and determine, in response to the position of the second virtual object being outside the detection range of the visual field picture, that the position of the second virtual object is outside the visual field picture.

Further, different directions may correspond to the same offset, or may correspond to different offsets.

In a possible implementation, the foregoing first target offset includes one offset. After obtaining the first target offset, the terminal offsets the visual field picture in various directions based on the offset included in the first target offset, to obtain a detection range of the visual field picture.

Figure 7:
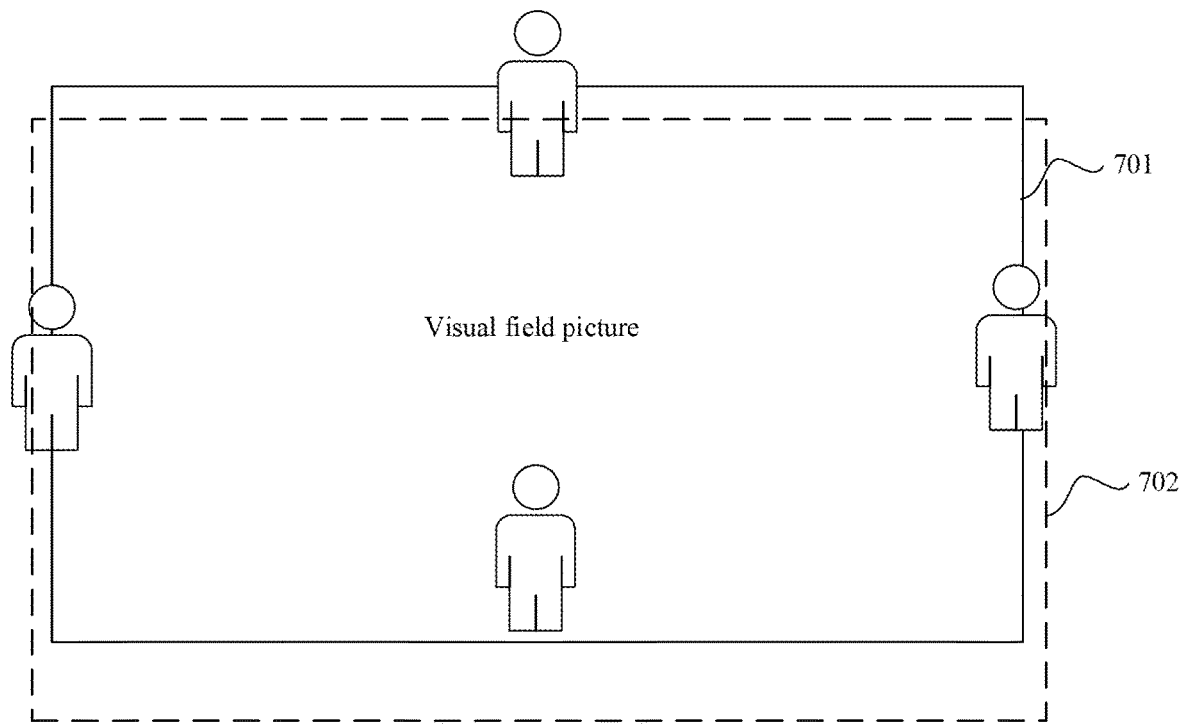
FIG. 7 is a schematic diagram of a position of a virtual object according to an embodiment of this application.

In another possible implementation, the foregoing first target offset includes a plurality of offsets, and different offsets correspond to different directions. After obtaining the first target offset, the terminal offsets the visual field picture in various directions based on the offsets included in the first target offset, to obtain a detection range of the visual field picture. For example, if the position of the second virtual object is identified by using a position of feet, the screen may be offset by 10% inward in an upper direction, by 15% outward in a lower direction, and by each 6% outward in left and right directions, and this is a detection range inside and outside the screen. As shown in FIG. 7, FIG. 7 shows an offset situation in which a visual field picture before an offset is 701, and a dashed-line box 702 obtained after the offset is a detection range of the visual field picture 701.

Similarly, when it is determined whether the position of the second virtual object is in a target region, the same detection manner may also be used. Specifically, the terminal may obtain, according to the visual field picture of the first virtual object and a target scaling ratio, a target region surrounding the visual field picture, offset the target region in various directions according to a second target offset, to obtain a detection range of the target region, and determine, in response to the position of the second virtual object being within the detection range of the target region, that the position of the second virtual object is within the target region.

The second target offset may be the same as or different from the first target offset. This is not limited in this embodiment of the application.

Similar to the foregoing first target offset, different directions may correspond to the same offset, or may correspond to different offsets. That is, the foregoing second target offset may include one offset, or may include a plurality of offsets for different directions. This is not limited in this embodiment of this application.

For second virtual objects that meet the other case, the terminal may analyze position relationships between the second virtual objects and the first virtual object, to determine a display region of indication information according to the position relationships.

The position relationship is a vector pointing from the position of the first virtual object to the position of the second virtual object, or the position relationship is a line segment between the position of the first virtual object and the position of the second virtual object. This is not limited in this embodiment of this application. Correspondingly, step 303 may be as follows: The terminal obtains, according to the position of the second virtual object and the position of the first virtual object, a vector pointing from the position of the first virtual object to the position of the second virtual object. Step 303 may alternatively be as follows: The terminal obtains a line segment between the position of the first virtual object and the position of the second virtual object according to the position of the second virtual object and the position of the first virtual object.

In step 304, the terminal determines a target edge region corresponding to the position relationship according to the position relationship and an edge region of the visual field picture.

The edge region is a region that has a distance with an edge line of the visual field picture less than a distance threshold. In a possible implementation, the edge region is a region formed by points that have distances with an edge line of the visual field picture less than a distance threshold, the distance threshold being a minimum display size when the indication information of the second virtual object is completely displayed. In another possible implementation, the foregoing edge region is a region in which the visual field picture does not overlap a reduced visual field picture after the current visual field picture is reduced according to a specific ratio.

The target edge region is the display region of the indication information, and the target edge region is a region in the edge region. The indication information is displayed at an edge of the visual field picture, thereby preventing the visual field picture from being excessively blocked while increasing an amount of displaying information.

The target edge region is related to the position relationship of the second virtual object relative to the first virtual object. In the foregoing implementation in which the position relationship is the vector or the line segment, correspondingly, step 304 may be as follows. The terminal obtains a coincident line segment between the vector or the line segment and the edge region, and further determines a target edge region based on the coincident line segment. In this way, an orientation of the second virtual object may be learned intuitively and clearly by using the target edge region. For example, after obtaining the foregoing coincident line segment, the terminal determines, by using any point on the coincident line segment as a center point, a region that uses a center as a center and a size as a target size as the target edge region.

Figure 8:
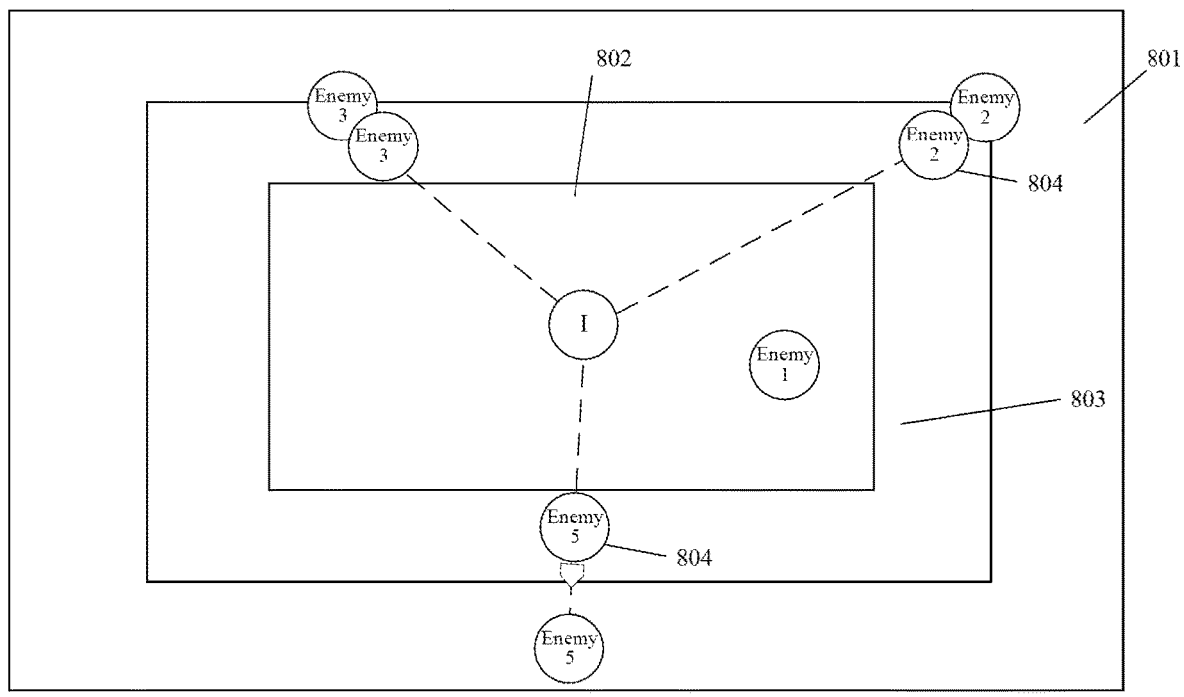
FIG. 8 is a schematic diagram of a position of a virtual object and a position of indication information according to an embodiment of this application.

For example, as shown in FIG. 8, a target region 801 and a visual field picture 802 are included in the figure, and the visual field picture 802 includes an edge region 803. If displayed prompt information is a hero avatar, it may be referred to as a display range of the hero avatar. For an enemy 3, an enemy 5, and an enemy 2 that meet the foregoing displayed prompt information condition, a target edge region 804 corresponding to the enemies may be determined by using a coincident line segment of edge regions 803 between a first virtual object ("I") and line segments of positions of the enemies.

In step 305, the terminal displays indication information of the second virtual object in the target edge region.

After determining the target edge region, the terminal may display prompt information in the target edge region. The indication information of the second virtual object includes at least one of an indication icon, a virtual health point, status information, a position indication, or a name of the second virtual object, the position indication being used for indicating a direction of the second virtual object relative to the first virtual object.

Figure 9:
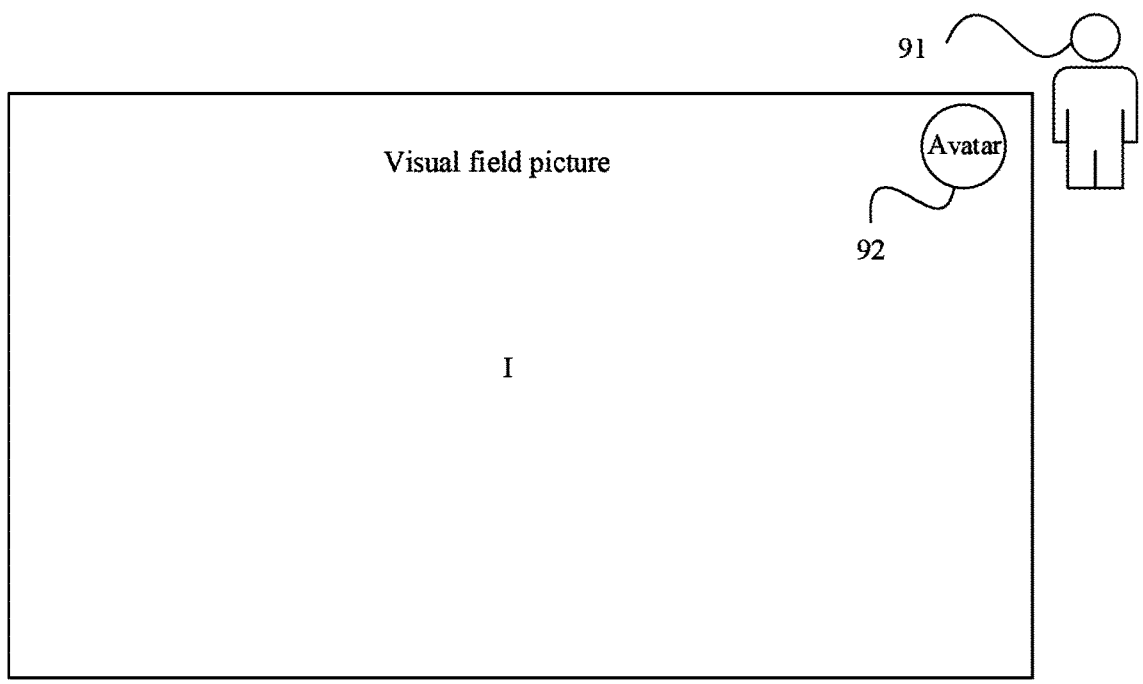
FIG. 9 is a schematic diagram of a position of a virtual object and a position of indication information according to an embodiment of this application.
Figure 10:
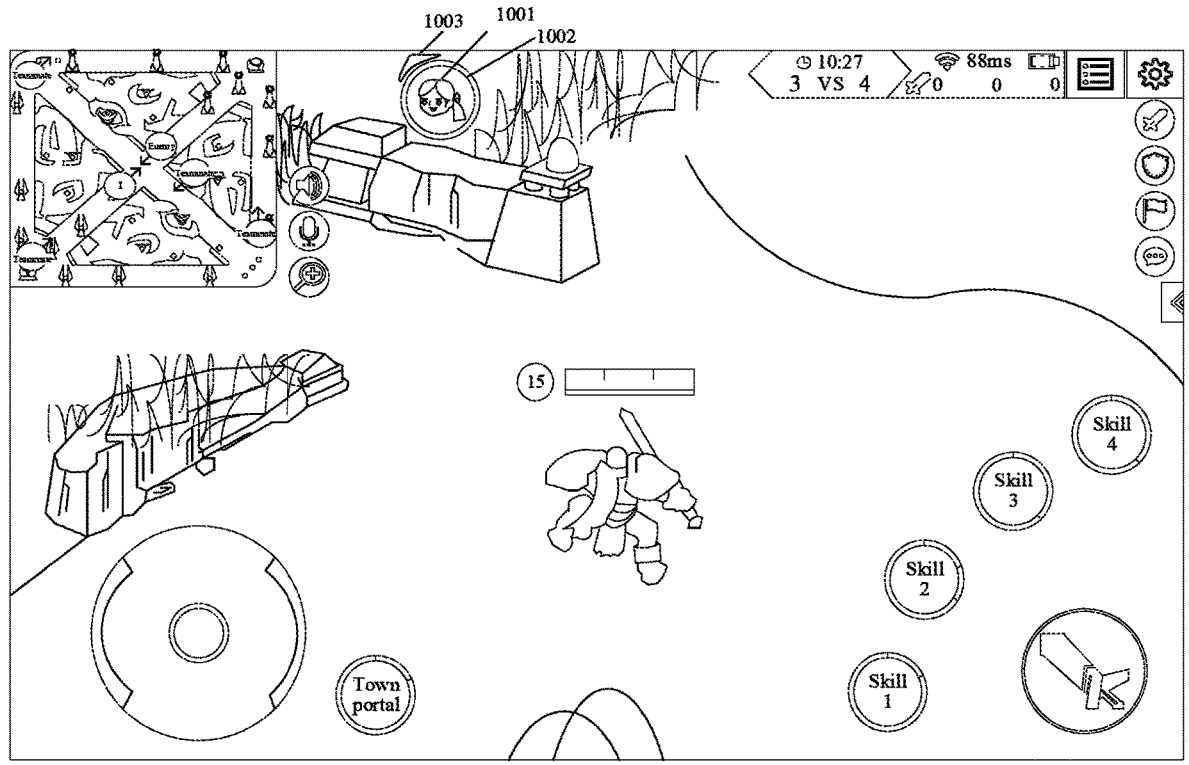
FIG. 10 is a schematic diagram of a terminal interface according to an embodiment of this application.

Step 303 to step 305 are the process of displaying indication information of the second virtual object in the target edge region corresponding to the position relationship in the visual field picture according to the position relationship of the second virtual object relative to the first virtual object. For example, as shown in FIG. 9, for an enemy 91 outside a screen (a visual field picture), because the enemy is outside the screen, the enemy cannot be displayed, but an avatar 92 of the enemy can be displayed at a corresponding position of an edge of the screen. A schematic diagram of a terminal interface may be shown in FIG. 10, and may show an indication icon 1001 (an avatar), a virtual health point 1002 (a blood volume), and a position indication 1003 (a direction of an enemy relative to "I") of an enemy.

In a possible implementation, the second virtual object is a virtual object pertaining to a team different from that of the first virtual object. That is, the second virtual object may be a hostile virtual object. When it is determined whether to display the indication information, a status of the second virtual object may be further referred. Specifically, the terminal may obtain the status of the second virtual object, and perform subsequent determination steps according to the status. Specifically, the following three cases may be included.

In Case 1, the terminal performs, in response to the status of the second virtual object being a visible status, the operation of displaying indication information of the second virtual object in the target edge region corresponding to the position relationship in the visual field picture according to a position relationship of the second virtual object relative to the first virtual object.

In Case 2, the terminal performs, in response to the status of the second virtual object being a survival status, the operation of displaying indication information of the second virtual object in the target edge region corresponding to the position relationship in the visual field picture according to a position relationship of the second virtual object relative to the first virtual object.

In Case 3, the terminal performs, in response to the status of the second virtual object being a visible status and a survival status, the operation of displaying indication information of the second virtual object in the target edge region corresponding to the position relationship in the visual field picture according to a position relationship of the second virtual object relative to the first virtual object.

In the foregoing three cases, the status of the second virtual object is considered. The foregoing operation may be performed when the second virtual object survives, or the foregoing operation may be performed when the second virtual object is visible, or the foregoing operation may be performed when the second virtual object survives and is visible.

Figure 11:
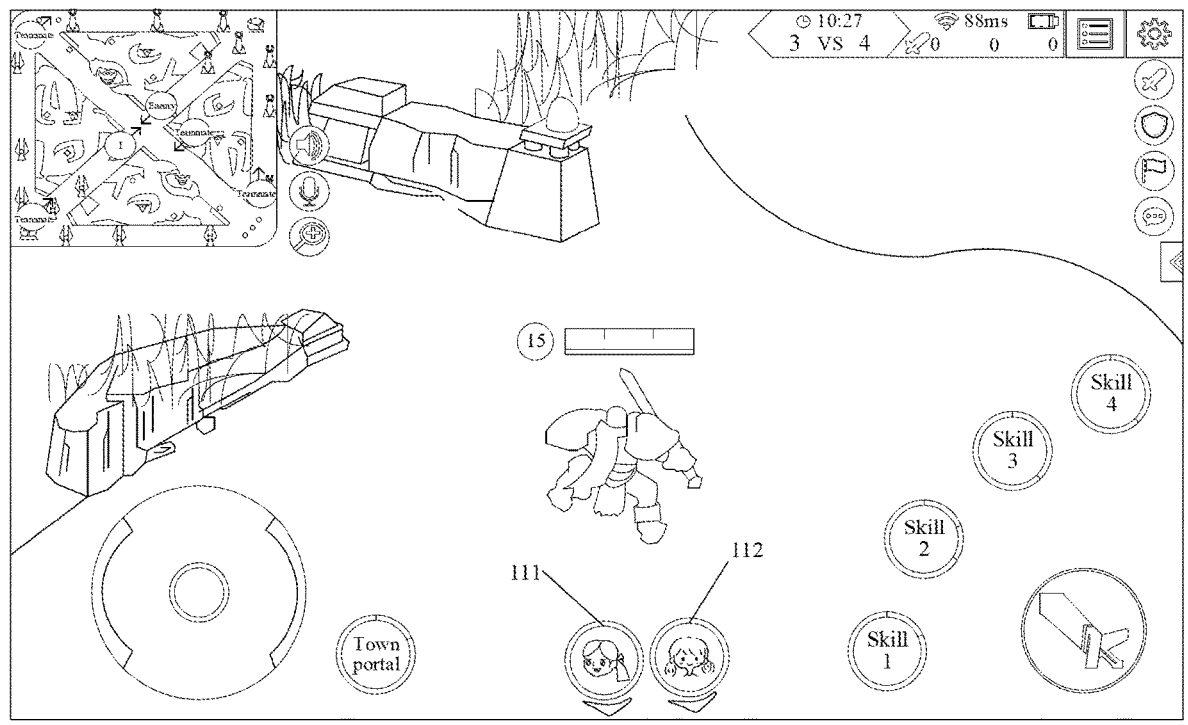
FIG. 11 is a schematic diagram of a terminal interface according to an embodiment of this application.

In a possible implementation, if there are a plurality of pieces of indication information that need to be displayed, but display regions of the plurality of pieces of indication information overlap, the plurality of pieces of indication information may be displayed in a tiled manner. In this way, the plurality of pieces of indication information are not displayed in an overlapping manner, thereby ensuring that the user can clearly see indication information of each second virtual object. Specifically, the terminal may display, in response to displaying indication information of at least two second virtual objects, and display regions of the at least two second virtual objects including indication information of two or more second virtual objects overlapping, the indication information of the two or more second virtual objects in a tiled manner. For example, as shown in FIG. 11, if two pieces of indication information overlap, the two pieces of indication information are displayed in a tiled manner. That is, if indication information 111 of a second virtual object A and indication information 112 of a second virtual object B overlap, the indication information 111 of the second virtual object A and the indication information 112 of the second virtual object B are displayed in a tiled manner in a graphical user interface.

Figure 12:
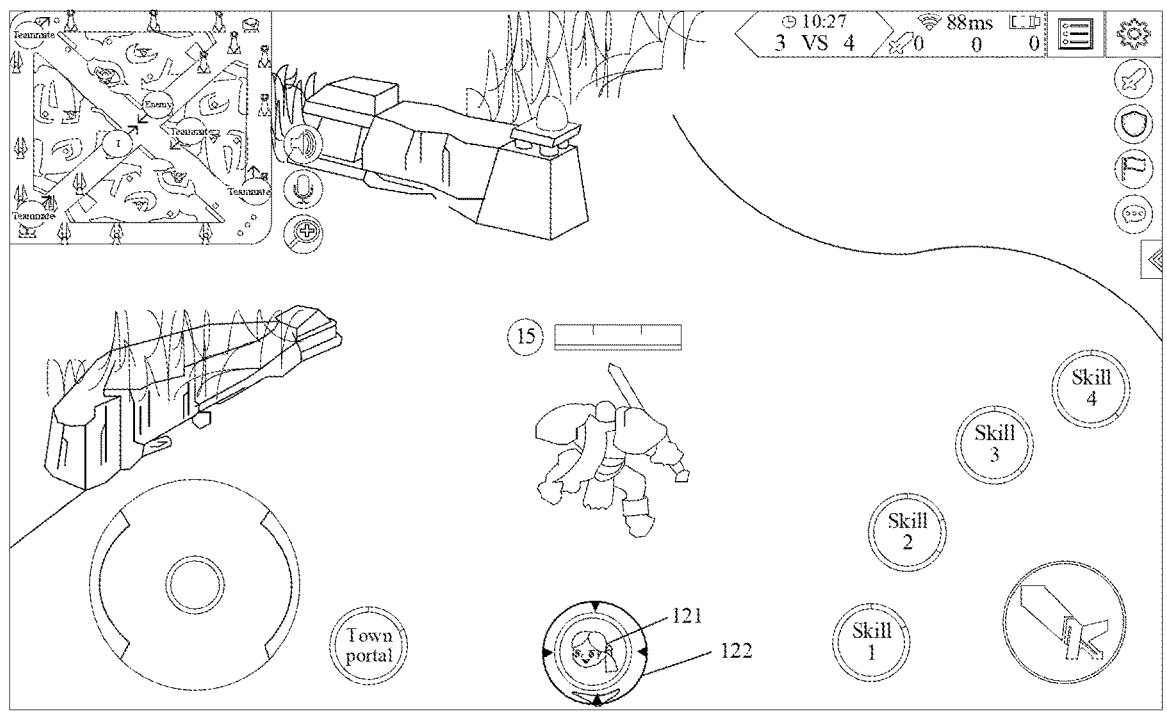
FIG. 12 is a schematic diagram of a terminal interface according to an embodiment of this application.

In a possible implementation, if the second virtual object is selected by a specific skill of the first virtual object, the terminal may highlight indication information, to intuitively indicate that the second virtual object is in a selected status. Specifically, the terminal may display the indication information of the second virtual object in response to a target selected by a skill released by the first virtual object being the second virtual object and according to a first display style. For example, as shown in FIG. 12, the first display style may be a "sight 122" displayed around indication information 121.

Figure 13:
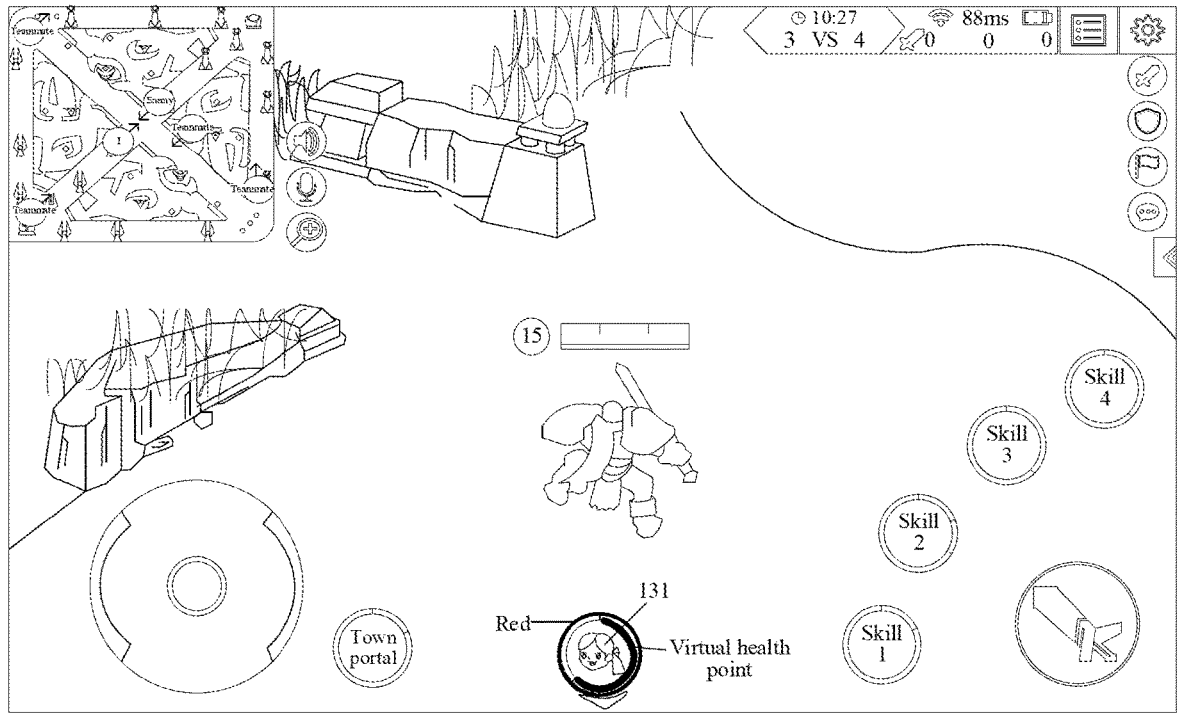
FIG. 13 is a schematic diagram of a terminal interface according to an embodiment of this application.

In a possible implementation, if the skill released by the first virtual object causes damage to the second virtual object or affects an attribute of the second virtual object, indication information may be further highlighted. Specifically, the terminal may display the indication information of the second virtual object within a target time period in response to an impact caused by a skill released by the first virtual object on the second virtual object and according to a second display style. For example, as shown in FIG. 13, the target time period may be within 1.5 seconds after a hit. The second display style may be displayed around indication information 131 according to a target color. For example, the target color may be red, and an avatar of the second virtual object may be displayed in red.

In this manner, the terminal may further update the displayed indication information of the second virtual object according to an impact of the skill on an attribute value of the second virtual object. For example, as shown in FIG. 13, if damage is caused to the second virtual object, it may be displayed that a virtual health point of the second virtual object is reduced.

Figure 14:
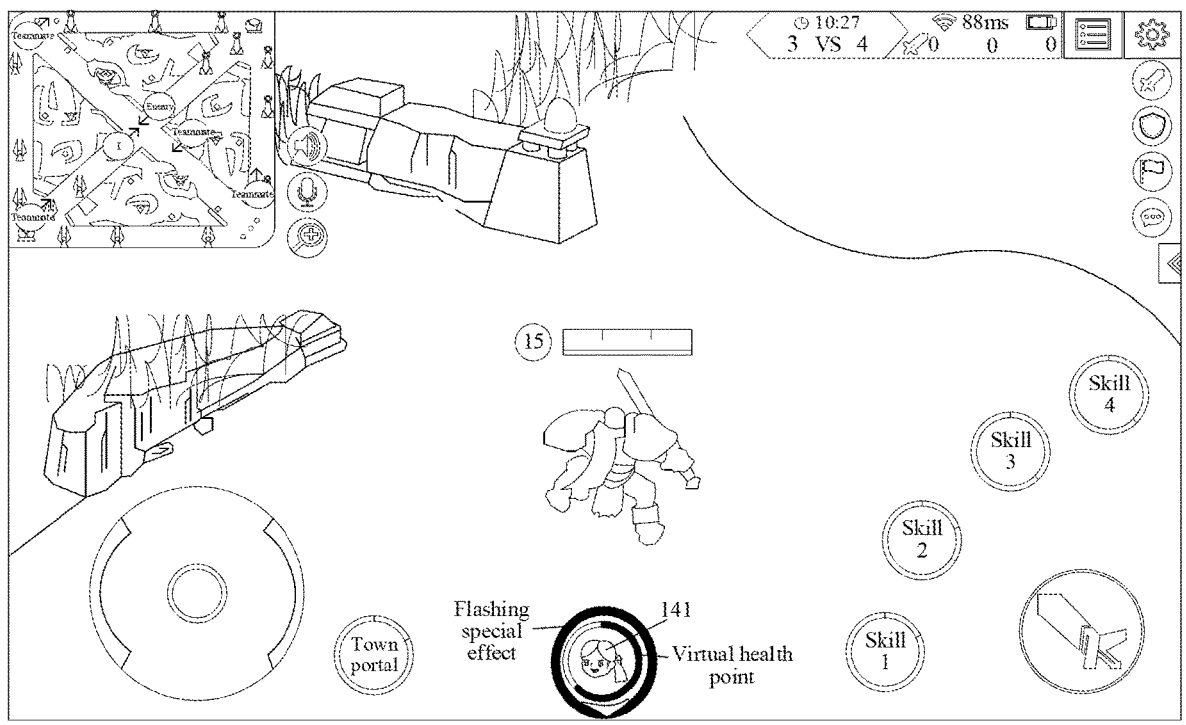
FIG. 14 is a schematic diagram of a terminal interface according to an embodiment of this application.

In a possible implementation, if indication information of a specific second virtual object is not displayed for a period of time, when the indication information is displayed again, a reminder special effect may be added. Specifically, the terminal may display the indication information of the second virtual object in response to a duration between a current system time and a time at which the indication information of the second virtual object is displayed last time being greater than a target duration and according to a third display style. For example, as shown in FIG. 14, the target duration may be 6 seconds. If indication information of an enemy is not displayed within 6 seconds, the indication information may be strongly reminded by using the third display style when being displayed again. For example, the third display style may be a flashing special effect displayed around indication information 141.

In this embodiment of this application, a position of a second virtual object is obtained, and when the second virtual object is within a target region outside a visual field picture, indication information of the second virtual object can be displayed at an edge of the current visual field picture, thereby achieving an effective prompt of the information of the second virtual object, and increasing an amount of information displayed in the visual field picture. In addition, the displayed information is not limited to the information in the visual field picture, thereby making an effective prompt of the information of the second virtual object outside the visual field picture, also assisting a user in better interacting with the second virtual object (for example, whether a specific skill successfully hits the second virtual object being determined by using the position of the second virtual object), and improving the control precision of the user on the second virtual object. Therefore, an information display effect in a game match is better.

Figure 15:
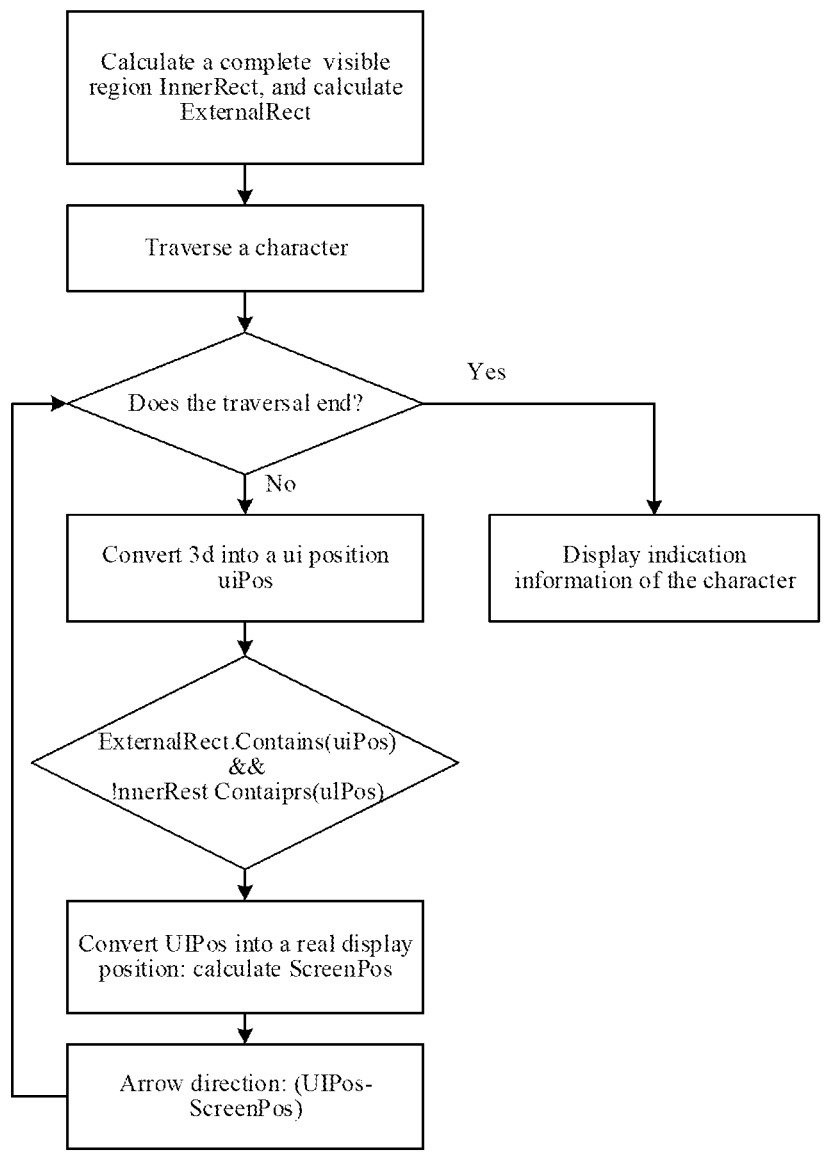
FIG. 15 is a flowchart of an information display method according to an embodiment of this application.

A specific example is provided below. As shown in FIG. 15, in the specific example, an example in which the second virtual object is an enemy hero is used. The terminal may traverse each enemy hero once, and there are three steps for the each hero to determine whether an avatar (that is, indication information) needs to be displayed and a position (that is, a target edge region) needs to be displayed. The three steps may be as follows.

In Step 1, a conversion from a real 3D scene position of a hero to a UI position.

In Step 2, it is determined whether the converted UI position is within a display range (that is, a target region).

In Step 3, the UI position is converted into a display position on a screen (that is, a target edge region), and an arrow (that is, a position indication) is processed.

Further, after the traversal ends, indication information of the enemy hero within the display range is displayed in a graphical user interface according to a traversal result.

For the foregoing step 2, this step may regarded as a process of filtering a position of an avatar. The position of the enemy hero is within a visible range of a camera. However, each enemy hero has a specific height, and the virtual camera is very likely to see only feet of the enemy hero instead of a whole body of the enemy hero, resulting in loss of visual attention. Therefore, for this case, a minimum visible screen range (InnerRect) may be set. For example, for an enemy 3 in FIG. 16, although a center position of the enemy 3 is within a screen range, it still needs to be considered that the enemy is actually invisible because a visible screen range is set. Specifically, the region division of the visual field picture in a screen and the division of a target region may be shown in FIG. 16.

Figure 16:
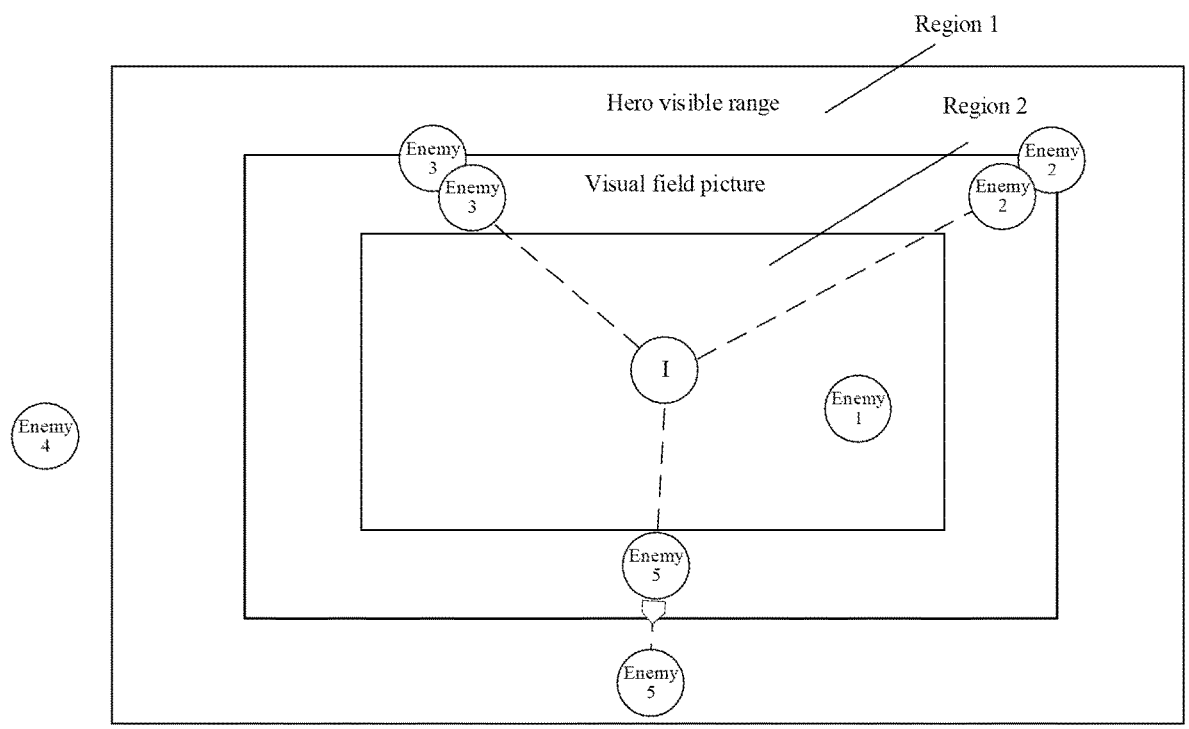
FIG. 16 is a schematic diagram of a position of a virtual object, a position of indication information, and various region ranges according to an embodiment of this application.

For example, as shown in FIG. 16, a region 1 is a hero complete visible range (InnerRect), and a process of obtaining the region 1 may be determined according to four values (pT, pB, pL, and pR). The four values respectively represent boundary values on the upper, lower, left, and right, and a range, that is, a rectangle 1, may be obtained by subtracting the four values from edges of a screen. A maximum range (ExternalRect) may be further set. If a hero is beyond the maximum range (ExternalRect) from a current character, the hero has no impact on the current hero temporarily. Therefore, there may be no need to consider the hero. In a specific example, a hero avatar visible range (a region 2) may be further set, and hero visible range=hero complete visible range (InnerRect)×Visible_Scale, where Visible_Scale may be set according to system requirements. With the foregoing setting, avatars within the complete visible range (of the enemy 1) and outside the display range (of the enemy 4) may be filtered out, remaining enemies 2, 3, and 5 may display avatars in an edge region, and a display effect may be shown in FIG. 8.

In a MOBA mobile game, due to a limitation of a lens range, an enemy unit at an edge of a lens is often not easy to be observed. In the manner provided in this embodiment of the application, a player can be successfully helped by using the edge of the screen to implement a warning to an enemy's designated unit (a hero), and to make an effective notification when a player character causes damage to the enemy's designated unit (the hero) outside the screen. Through this technical solution, the player may master more enemy unit information in the game, and therefore plays the game more conveniently.

Figure 17:
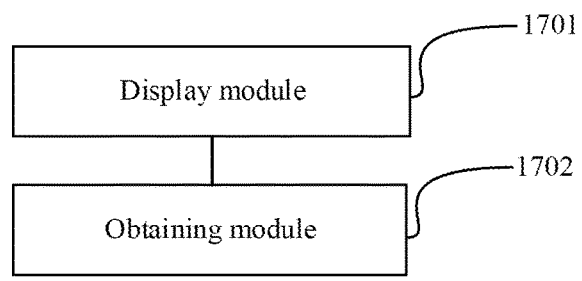
FIG. 17 is a schematic structural diagram of an information display apparatus according to an embodiment of this application.

FIG. 17 is a schematic structural diagram of an information display apparatus according to an embodiment of this application. As shown in FIG. 17, the apparatus includes: a display module 1701, configured to control, according to a position of a first virtual object, display of a visual field picture of the first virtual object in a graphical user interface; and an obtaining module 1702, configured to obtain a position of a second virtual object, the display module 1701 being further configured to control display of indication information of the second virtual object in a target edge region corresponding to the position relationship in the visual field picture in response to the position of the second virtual object being within a target region and according to a position relationship of the second virtual object relative to the first virtual object, the target region being a region outside the visual field picture and surrounding the visual field picture. One or more of the modules can be implemented by processing circuitry, software, or a combination thereof, for example.

In a possible implementation, the position relationship includes a vector pointing from the position of the first virtual object to the position of the second virtual object, or a line segment between the first virtual object and the second virtual object. The display module 1701 is configured to: obtain a coincident line segment between the vector or the line segment and an edge region of the visual field picture, the edge region being a region formed by points that have distances with an edge line of the visual field picture less than a distance threshold, the distance threshold being a minimum display size when the indication information of the second virtual object is completely displayed. The display module 1701 is further configured to determine a target edge region based on the coincident line segment, and display the indication information of the second virtual object in the target edge region.

In a possible implementation, the obtaining module 1702 is configured to: obtain a 3D position of the second virtual object in a virtual scene; and convert the 3D position of the second virtual object into a 2D position according to an angle between a virtual camera and a vertical direction.

In a possible implementation, the obtaining module 1702 is further configured to obtain, according to the visual field picture of the first virtual object and a target scaling ratio, a target region surrounding the visual field picture. The apparatus further includes: an offset module, configured to offset the target region in various directions according to a second target offset, to obtain a detection range of the target region, and a determining module, configured to determine, in response to the position of the second virtual object being within the detection range of the target region, that the position of the second virtual object is within the target region.

In a possible implementation, the indication information of the second virtual object includes at least one of an indication icon, a virtual health point, status information, a position indication, or a name of the second virtual object, the position indication being used for indicating a direction of the second virtual object relative to the first virtual object.

In a possible implementation, the second virtual object is a virtual object pertaining to a team different from that of the first virtual object, the obtaining module 1702 is further configured to obtain a status of the second virtual object, and the display module 1701 is configured to perform, in response to the status of the second virtual object being a visible status, the operation of displaying indication information of the second virtual object in the visual field picture according to a position relationship of the second virtual object relative to the first virtual object. Alternatively, the display module 1701 is configured to perform, in response to the status of the second virtual object being a survival status, the operation of displaying indication information of the second virtual object in the visual field picture according to a position relationship of the second virtual object relative to the first virtual object. Alternatively, the display module 1701 is configured to perform, in response to the status of the second virtual object being a visible status and a survival status, the operation of displaying indication information of the second virtual object in the visual field picture according to a position relationship of the second virtual object relative to the first virtual object.

In a possible implementation, the display module 1701 is configured to display the indication information of the second virtual object in response to a duration between a current system time and a time at which the indication information of the second virtual object is displayed last time being greater than a target duration and according to a third display style.

In a possible implementation, the display module 1701 is further configured to display, in response to displaying indication information of at least two second virtual objects, and display regions of the at least two second virtual objects including indication information of two or more second virtual objects overlapping, the indication information of the two or more second virtual objects in a tiled manner.

In a possible implementation, the display module 1701 is further configured to display the indication information of the second virtual object in response to a target selected by a skill released by the first virtual object being the second virtual object and according to a first display style.

In a possible implementation, the display module 1701 is further configured to display the indication information of the second virtual object within a target time period in response to an impact caused by a skill released by the first virtual object on the second virtual object and according to a second display style.

In the apparatus provided in the embodiments of this application, a position of a second virtual object may be obtained, and when the second virtual object is within a target region outside a visual field picture, indication information of the second virtual object can be displayed at an edge of the current visual field picture, thereby achieving an effective prompt of the information of the second virtual object, and increasing an amount of displaying information in the visual field picture. In addition, the displayed information is not limited to the information in the visual field picture, thereby making an effective prompt of the information of the second virtual object outside the visual field picture, also assisting a user in better interacting with the second virtual object (for example, whether a specific skill successfully hits the second virtual object being determined by using the position of the second virtual object), and improving the control precision of the user on the second virtual object. Therefore, an information display effect in a game match is better.

When the information display apparatus provided in the foregoing embodiments displays information, the division of the foregoing functional modules is merely used as an example for description. In actual applications, the foregoing functions may be allocated to different functional modules according to system requirements. That is, an inner structure of the device is divided into different functional modules to complete all or some of the functions described above. In addition, the embodiments of the information display apparatus and the information display method provided in the foregoing embodiments belong to the same conception. For the specific implementation process, reference may be made to the embodiments of the information display method, and details are not described herein again.

Figure 18:
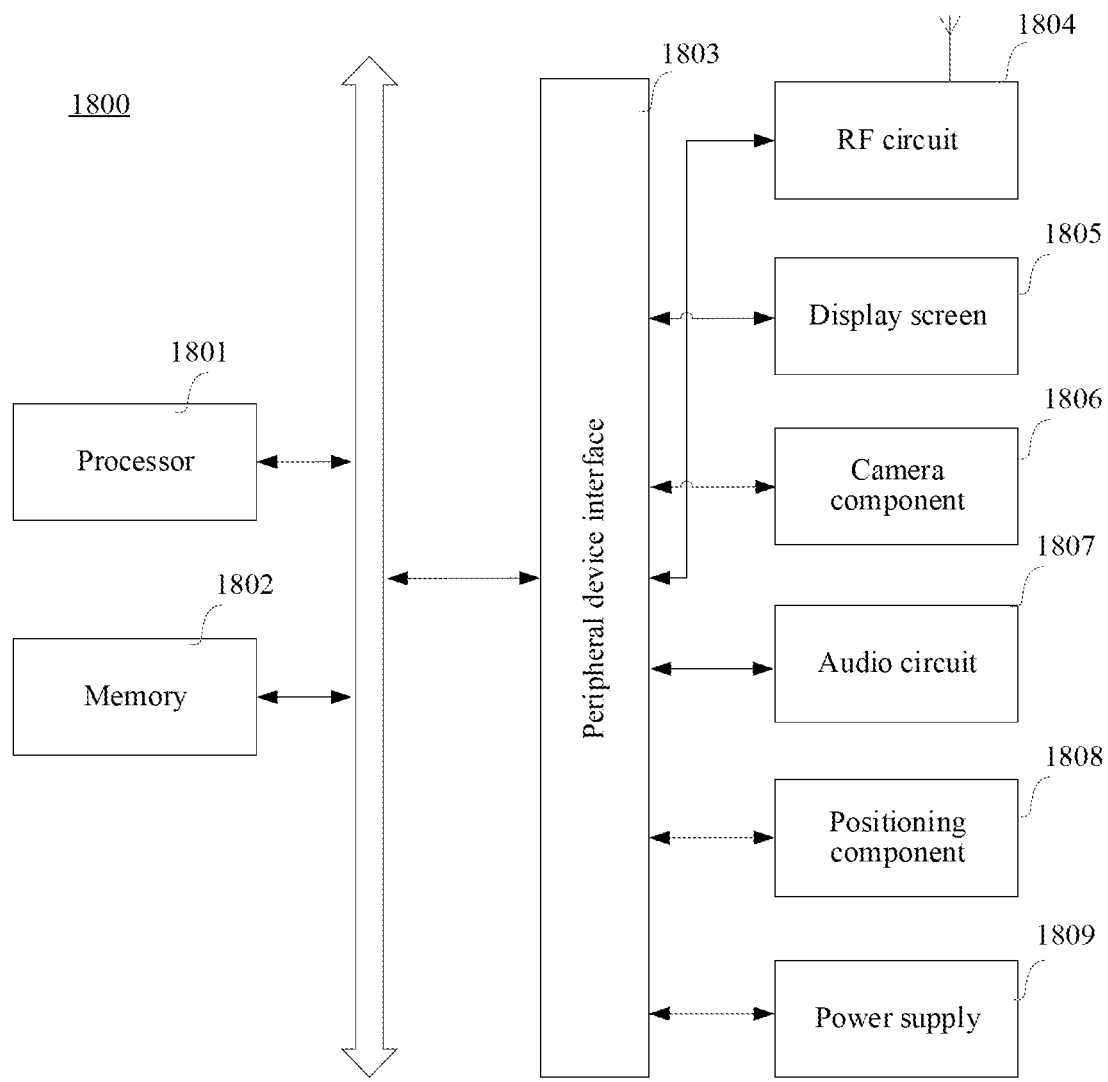
FIG. 18 is a schematic structural diagram of a terminal according to an embodiment of this application.

The electronic device may be provided as a terminal shown in FIG. 18, or may be provided as a server shown in FIG. 24. This is not limited in this embodiment of this application.

FIG. 18 is a schematic structural diagram of a terminal 1800 according to an embodiment of this application. The terminal 1800 may be a smartphone, a tablet computer, an MP3 player, an MP4 player, a notebook computer, or a desktop computer. The terminal 1800 may also be referred to other names such as user equipment, a portable terminal, a laptop terminal, or a desktop terminal.

Generally, the terminal 1800 includes a processor (processing circuitry) 1801 and a memory (non-transitory computer-readable storage medium) 1802.

The processor 1801 may include one or more processing cores, for example, a 4-core processor or an 8-core processor. The processor 1801 may be implemented in at least one hardware form of digital signal processing (DSP), a field programmable gate array (FPGA), and a programmable logic array (PLA). The processor 1801 may alternatively include a main processor and a coprocessor. The main processor is a processor configured to process data in an awake state, and is also referred to as a central processing unit (CPU), and the coprocessor is a low-power processor configured to process data in a standby state. In some embodiments, the processor 1801 may be integrated with a graphics processing unit (GPU). The GPU is configured to render and draw content that needs to be displayed on a display screen. In some embodiments, the processor 1801 may further include an AI processor. The AI processor is configured to process computing operations related to machine learning.

The memory 1802 may include one or more computer-readable storage media. The computer-readable storage media may be non-transient. The memory 1802 may further include a high-speed random access memory (RAM) and a non-volatile memory, for example, one or more disk storage devices or flash memory devices. In some embodiments, a non-transitory computer-readable storage medium in the memory 1802 is configured to store at least one instruction, the at least one instruction being configured to be executed by the processor 1801 to implement the method steps on a terminal side in the information display method provided in the embodiments of this application.

In some embodiments, the terminal 1800 may further include a peripheral device interface 1803 and at least one peripheral device. The processor 1801, the memory 1802, and the peripheral device interface 1803 may be connected through a bus or a signal line. Each peripheral device may be connected to the peripheral device interface 1803 by using a bus, a signal cable, or a circuit board. Specifically, the peripheral device includes: at least one of a radio frequency (RF) circuit 1804, a display screen 1805, a camera component 1806, an audio circuit 1807, a positioning component 1808, and a power supply 1809.

A person skilled in the art may understand that the structure shown in FIG. 18 does not constitute a limitation on the terminal 1800, and the terminal may include more components or fewer components than those shown in the figure, or some components may be combined, or a different component deployment may be used.

Figure 19:
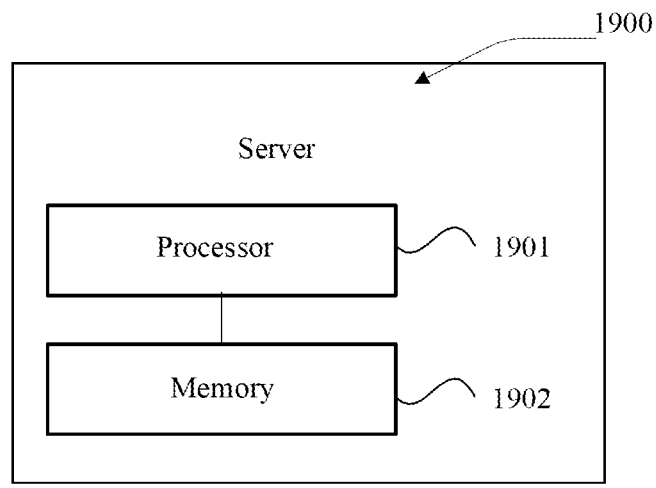
FIG. 19 is a schematic structural diagram of a server according to an embodiment of this application.

FIG. 19 is a schematic structural diagram of a server 1900 according to an embodiment of this application. The server 1900 may vary greatly due to different configurations or performance, and may include one or more CPUs 1901 and one or more memories 1902. The memory 1902 stores at least one piece of program code, the at least one piece of program code being loaded and executed by the processor 1901 to implement the method steps on a server side in the information display method provided in the embodiments. The server 1900 may also have a wired or wireless network interface, a keyboard, an input/output interface and other components to facilitate input/output. The server 1900 may also include other components for implementing device functions. Details are not described herein again.

In an exemplary embodiment, a computer-readable storage medium, for example, a memory including at least one piece of program code is further provided. The at least one piece of program code may be executed by a processor in an electronic device to implement the information display method in the foregoing embodiments. For example, the computer-readable storage medium may be a read-only memory (ROM), a RAM, a compact disc read-only memory (CD-ROM), a magnetic tape, a floppy disk, an optical data storage device, or the like.

In an exemplary embodiment, a computer program product or a computer program is further provided, the computer program product or the computer program including computer instructions, the computer instructions being stored in a computer-readable storage medium. A processor of an electronic device reads the computer instructions from the computer-readable storage medium, and the processor executes the computer instructions, to cause the electronic device to perform the foregoing information display method.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely optional embodiments of this application, but are not intended to limit this application. Any modification, equivalent replacement, or improvement made within the spirit and principle of this application falls within the protection scope of this application.

What is claimed is:

1. An information display method comprising:
controlling, according to a position of a first virtual character that is configured to move and perform actions in a virtual environment of a game based on user inputs via a user input interface of an electronic device, display of a visual field picture of the first virtual character in the virtual environment and a graphical user interface;
obtaining a position of a second virtual character that is configured to move and perform actions in the virtual environment;
controlling display, by processing circuitry of the electronic device, of indication information of the second virtual character in the visual field picture in response to the position of the second virtual character in the virtual environment being within a target region of the first virtual character and according to a position relationship of the second virtual character relative to the first virtual character, the target region being a region outside the visual field picture; and
displaying, according to a first display style, the indication information of the second virtual character in response to a target selected by a skill released by the first virtual character being the second virtual character.

2. The method according to claim 1, wherein the position relationship comprises a vector pointing from the position of the first virtual character to the position of the second virtual character, or a line segment between the first virtual character and the second virtual character; and
the controlling display of the indication information of the second virtual character in the visual field picture according to the position relationship of the second virtual character relative to the first virtual character comprises:
obtaining a coincident line segment of the vector or the line segment that is located in an edge region of the visual field picture, the edge region being a region formed by points that have distances from an edge line of the visual field picture less than a distance threshold, the distance threshold being a minimum display size when the indication information of the second virtual character is completely displayed;
determining a target edge region based on the coincident line segment; and
displaying the indication information of the second virtual character in the target edge region.

3. The method according to claim 1, wherein the obtaining the position of the second virtual character comprises:
obtaining a three-dimensional (3D) position of the second virtual character in a virtual scene; and
converting the 3D position of the second virtual character into a two-dimensional (2D) position according to an angle between a virtual camera and a vertical direction.

4. The method according to claim 1, wherein before the controlling the display of the indication information of the second virtual character in the visual field picture in response to the position of the second virtual character being within the target region and according to the position relationship of the second virtual character relative to the first virtual character, the method further comprises:
obtaining, according to the visual field picture of the first virtual character and a target scaling ratio, a target region surrounding the visual field picture;

offsetting the target region in various directions according to a second target offset, to obtain a detection range of the target region; and determining, in response to the position of the second virtual character being within the detection range of the target region, that the position of the second virtual character is within the target region.

5. The method according to claim 1, wherein the indication information of the second virtual character comprises at least one of an indication icon, a virtual health point, status information, a position indication, or a name of the second virtual character, the position indication being used for indicating a direction of the second virtual character relative to the first virtual character.

6. The method according to claim 1, wherein the second virtual character is a virtual character pertaining to a team different from a team of the first virtual character;

the method further comprises obtaining a status of the second virtual character; and the controlling the display of the indication information of the second virtual character in the visual field picture according to the position relationship of the second virtual character relative to the first virtual character comprises:

performing, in response to the status of the second virtual character being a visible status, the displaying the indication information of the second virtual character in the visual field picture according to the position relationship of the second virtual character relative to the first virtual character; or performing, in response to the status of the second virtual character being a survival status, the displaying the indication information of the second virtual character in the visual field picture according to the position relationship of the second virtual character relative to the first virtual character; or performing, in response to the status of the second virtual character being the visible status and the survival status, the displaying the indication information of the second virtual character in the visual field picture according to the position relationship of the second virtual character relative to the first virtual character.

7. The method according to claim 1, further comprising:
displaying, in response to displaying indication information of at least two second virtual characters, and display regions of the at least two second virtual characters overlapping, the indication information of the at least two second virtual characters in a tiled manner.

8. The method according to claim 1, further comprising:
displaying, according to a second display style, the indication information of the second virtual character within a target time period in response to an impact caused by the skill released by the first virtual character on the second virtual character.

9. The method according to claim 1, wherein the controlling the display of the indication information of the second virtual character comprises:

displaying, according to a third display style, the indication information of the second virtual character in response to a duration between a current system time and a time at which the indication information of the second virtual character was displayed last time being greater than a target duration.

10. An information display apparatus, comprising:
processing circuitry configured to control display, according to a position of a first virtual character that is configured to move and perform actions in a virtual environment of a game based on user inputs via a user input interface of an electronic device, of a visual field picture of the first virtual character in the virtual environment and a graphical user interface;

obtain a position of a second virtual character that is configured to move and perform actions in the virtual environment;

control display of indication information of the second virtual character in the visual field picture in response to the position of the second virtual character in the virtual environment being within a target region of the first virtual character and according to a position relationship of the second virtual character relative to the first virtual character, the target region being a region outside the visual field picture; and control display, according to a first display style, of the indication information of the second virtual character in response to a target selected by a skill released by the first virtual character being the second virtual character.

11. The information display apparatus according to claim 10, wherein the position relationship comprises a vector pointing from the position of the first virtual character to the position of the second virtual character, or a line segment between the first virtual character and the second virtual character; and the processing circuitry is configured to control the display of the indication information of the second virtual character in the visual field picture according to the position relationship of the second virtual character relative to the first virtual character by:

obtaining a coincident line segment of the vector or the line segment that is located in an edge region of the visual field picture, the edge region being a region formed by points that have distances from an edge line of the visual field picture less than a distance threshold, the distance threshold being a minimum display size when the indication information of the second virtual character is completely displayed;

determining a target edge region based on the coincident line segment; and displaying the indication information of the second virtual character in the target edge region.

12. The information display apparatus according to claim 10, wherein the processing circuitry is configured to obtain the position of the second virtual character by:

obtaining a three-dimensional (3D) position of the second virtual character in a virtual scene; and converting the 3D position of the second virtual character into a two-dimensional (2D) position according to an angle between a virtual camera and a vertical direction.

13. The information display apparatus according to claim 10, wherein before the controlling the display of the indication information of the second virtual character in the visual field picture in response to the position of the second virtual character being within the target region and according to the position relationship of the second virtual character relative to the first virtual character, the processing circuitry is further configured to:

obtain, according to the visual field picture of the first virtual character and a target scaling ratio, a target region surrounding the visual field picture;

offset the target region in various directions according to a second target offset, to obtain a detection range of the target region; and determine, in response to the position of the second virtual character being within the detection range of the target region, that the position of the second virtual character is within the target region.

14. The information display apparatus according to claim 10, wherein the indication information of the second virtual character comprises at least one of an indication icon, a virtual health point, status information, a position indication, or a name of the second virtual character, the position indication being used for indicating a direction of the second virtual character relative to the first virtual character.

15. The information display apparatus according to claim 10, wherein the second virtual character is a virtual character pertaining to a team different from a team of the first virtual character;

the processing circuitry is further configured to obtain a status of the second virtual character; and the processing circuitry is configured to control the display of the indication information of the second virtual character in the visual field picture according to the position relationship of the second virtual character relative to the first virtual character by:

performing, in response to the status of the second virtual character being a visible status, the displaying the indication information of the second virtual character in the visual field picture according to the position relationship of the second virtual character relative to the first virtual character; or performing, in response to the status of the second virtual character being a survival status, the displaying the indication information of the second virtual character in the visual field picture according to the position relationship of the second virtual character relative to the first virtual character; or performing, in response to the status of the second virtual character being the visible status and the survival status, the displaying the indication information of the second virtual character in the visual field picture according to the position relationship of the second virtual character relative to the first virtual character.

16. The information display apparatus according to claim 10, the processing circuitry being further configured to:

control, in response to displaying indication information of at least two second virtual characters, and display regions of the at least two second virtual characters overlapping, display of the indication information of the at least two second virtual characters in a tiled manner.

17. The information display apparatus according to claim 10, the processing circuitry being further configured to:

control display, according to a second display style, of the indication information of the second virtual character within a target time period in response to an impact caused by the skill released by the first virtual character on the second virtual character.

18. A non-transitory computer-readable storage medium storing computer-readable instructions thereon, which, when executed by a processor of an electronic device, cause the processor of the electronic device to perform an information display method comprising:

controlling, according to a position of a first virtual character that is configured to move and perform actions in a virtual environment of a game based on user inputs via a user input interface of the electronic device, display of a visual field picture of the first virtual character in the virtual environment and a graphical user interface;

obtaining a position of a second virtual character that is configured to move and perform actions in the virtual environment;

controlling display of indication information of the second virtual character in the visual field picture in response to the position of the second virtual character in the virtual environment being within a target region of the first virtual character and according to a position relationship of the second virtual character relative to the first virtual character, the target region being a region outside the visual field picture; and displaying, according to a first display style, the indication information of the second virtual character in response to a target selected by a skill released by the first virtual character being the second virtual character.

* * * * *